(12) United States Patent
Thomson et al.

(10) Patent No.: US 7,500,415 B2
(45) Date of Patent: Mar. 10, 2009

(54) OBJECT CLAMP, SUCH AS FOR BICYCLE COMPONENT, HAVING AT LEAST ONE RELIEF AREA AND RELATED METHODS

(75) Inventors: Loronzo H. Thomson, Warner Robins, GA (US); Brian Thomson, Warner Robins, GA (US)

(73) Assignee: L.H. Thomson Company, Inc., Macon, GA (US)

( * ) Notice: Subject to any disclaimer, the term of this patent is extended or adjusted under 35 U.S.C. 154(b) by 847 days.

(21) Appl. No.: 10/121,027

(22) Filed: Apr. 11, 2002

(65) Prior Publication Data

US 2002/0148323 A1    Oct. 17, 2002

Related U.S. Application Data

(63) Continuation-in-part of application No. 09/658,509, filed on Sep. 8, 2000, now Pat. No. 6,945,135.

(60) Provisional application No. 60/283,105, filed on Apr. 11, 2001, provisional application No. 60/153,159, filed on Sep. 9, 1999.

(51) Int. Cl.
*B62K 21/12* (2006.01)
*B25G 3/20* (2006.01)
*F16B 2/00* (2006.01)
*F16B 7/04* (2006.01)

(52) U.S. Cl. ............... 74/551.1; 74/551.8; 280/279; 403/354; 403/357; 403/373; 403/375

(58) Field of Classification Search ..... 74/551.1–551.8, 74/501.6–502.2, 594.1–594.7; 280/279; 403/354, 357, 373, 375
See application file for complete search history.

(56) References Cited

U.S. PATENT DOCUMENTS

| 512,303   | A | * | 1/1894  | Lipe ............................. 403/375 |
| 670,040   | A | * | 3/1901  | Thompson ................... 403/373 |
| 1,836,348 | A | * | 12/1931 | Wardell ...................... 403/361 |
| 1,920,602 | A | * | 8/1933  | Smallwood .................. 403/309 |
| 2,341,821 | A | * | 2/1944  | Schwinn ..................... 403/228 |
| 3,722,930 | A | * | 3/1973  | Humlong ..................... 403/395 |
| 3,868,193 | A | * | 2/1975  | Schott ......................... 403/344 |
| 4,043,688 | A | * | 8/1977  | Humlong ..................... 403/209 |
| 4,322,087 | A | * | 3/1982  | Addicks ...................... 280/279 |

(Continued)

FOREIGN PATENT DOCUMENTS

DE    298 09 997    8/1998

(Continued)

*Primary Examiner*—Vinh T. Luong
(74) *Attorney, Agent, or Firm*—Allen, Dyer, Doppelt, Milbrath & Gilchrist, P.A.

(57) ABSTRACT

An object clamp includes first and second clamp portions having recesses therein defining a generally circular cylindrical opening for receiving an object to be clamped. The first and second opposing clamp portions have at least one pair of opposing ends when in a preclamped state and at least one fastener for urging the ends towards each other when in a clamped state. At least one relief area is formed in the recesses and is deflected into engagement with the object when the object clamp is in the clamped state. The object to be clamped may be a bicycle steering tube, a bicycle handle bar, or a bicycle seat tube, for example.

21 Claims, 19 Drawing Sheets

U.S. PATENT DOCUMENTS

| | | | |
|---|---|---|---|
| 4,428,697 A | 1/1984 | Ruland | 403/344 |
| 4,537,525 A * | 8/1985 | McMurtrey | 403/191 |
| 5,096,327 A | 3/1992 | Ruland | 403/290 |
| 5,517,878 A | 5/1996 | Klein et al. | 74/551.3 |
| 5,678,458 A | 10/1997 | Kao | 74/551.3 |
| 5,687,616 A | 11/1997 | Marui | 74/551.1 |
| 5,758,856 A | 6/1998 | Carnahan et al. | 248/523 |
| 5,842,385 A | 12/1998 | Su | 74/551.3 |
| 5,881,606 A | 3/1999 | Roddy | 74/551.3 |
| 5,904,442 A * | 5/1999 | Takeda | 403/392 |
| 5,941,653 A | 8/1999 | Cipriani | 403/344 |
| 5,947,498 A | 9/1999 | Rajaee | 280/276 |
| 6,176,640 B1 | 1/2001 | Gonczi | 403/375 |
| 6,309,135 B1 | 10/2001 | Thomson et al. | 403/344 |
| 2001/0045701 A1 | 11/2001 | Toal | |
| 2004/0112168 A1* | 6/2004 | Alley | 74/551.8 |
| 2005/0248120 A1* | 11/2005 | McJunkin et al. | 280/279 |
| 2007/0241531 A1* | 10/2007 | D'Aluisio et al. | 280/279 |

FOREIGN PATENT DOCUMENTS

| | | |
|---|---|---|
| DE | 199 08 651 | 8/2000 |
| EP | 1 026 410 | 8/2000 |

* cited by examiner

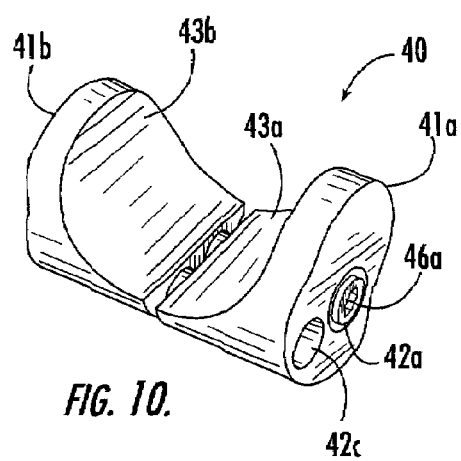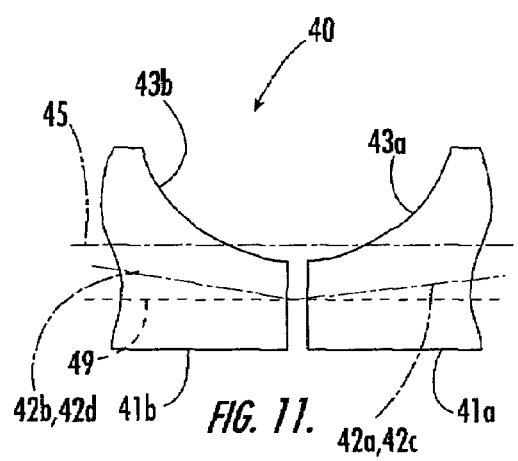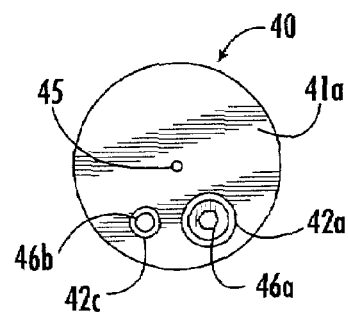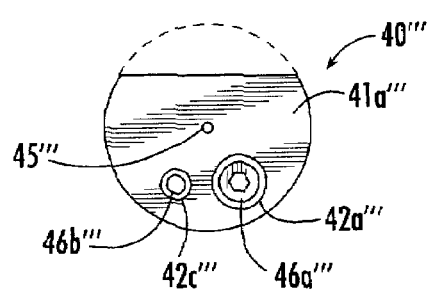

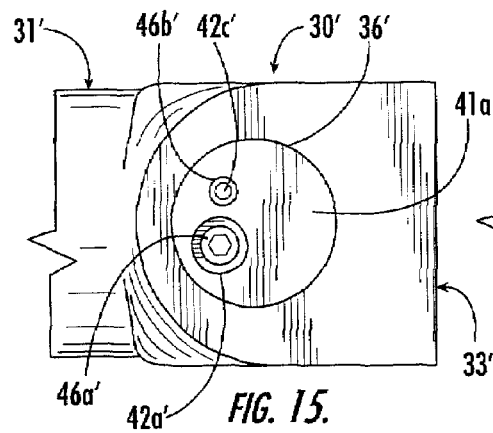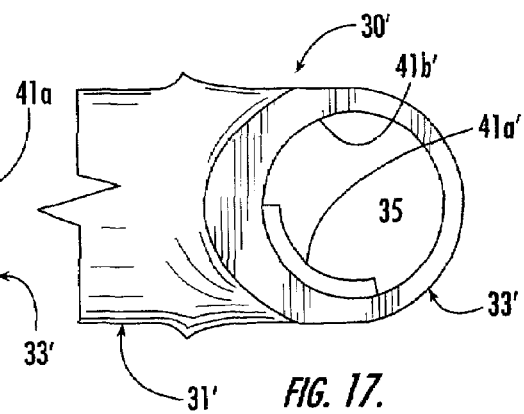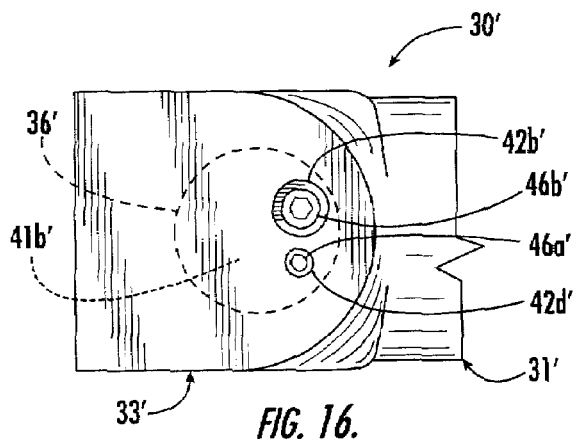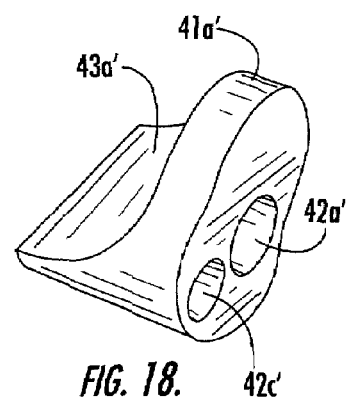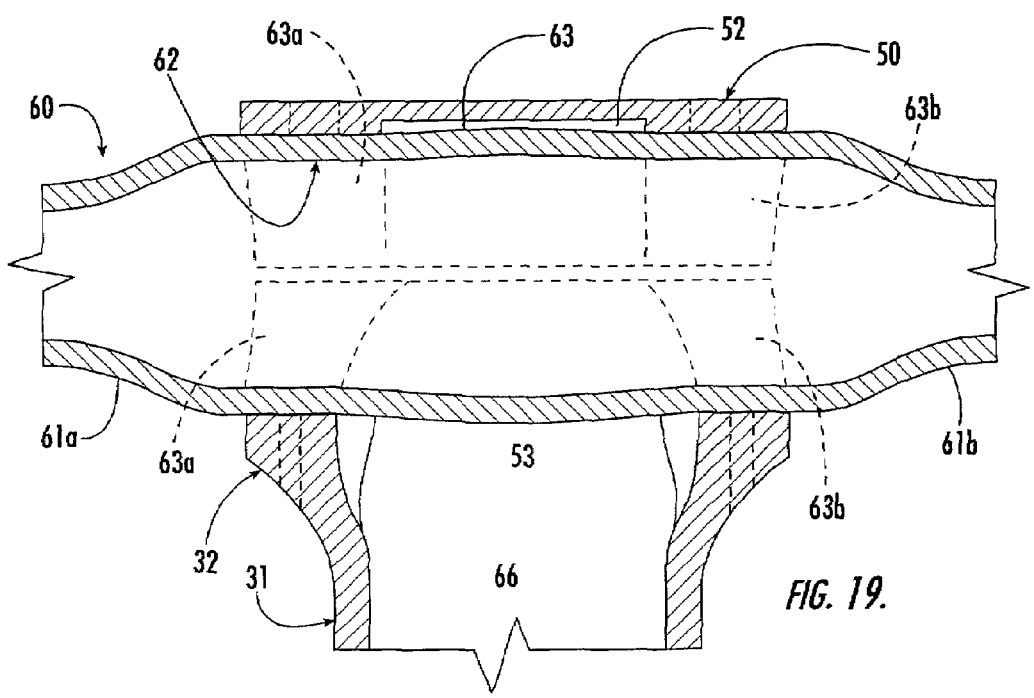

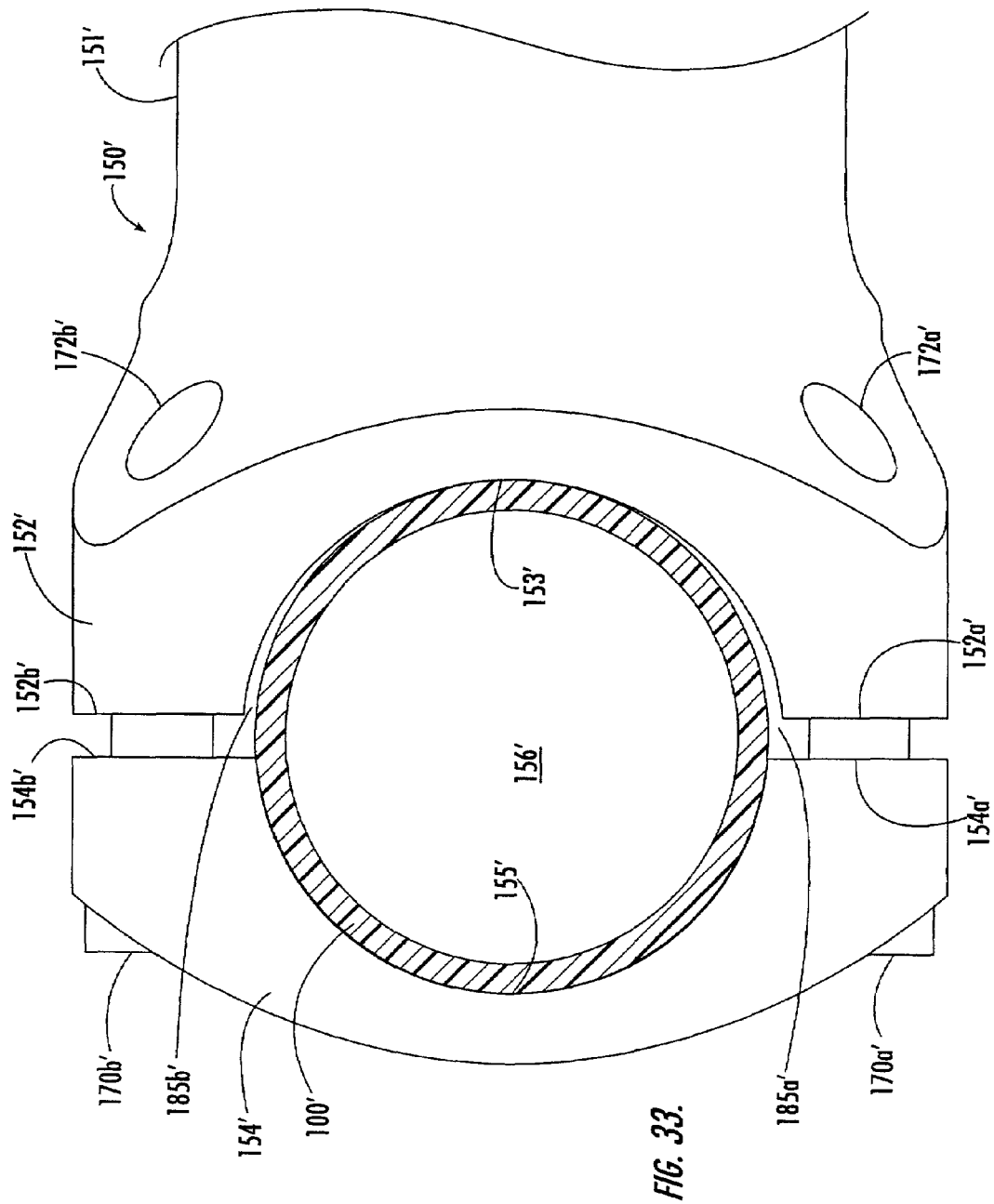

OBJECT CLAMP, SUCH AS FOR BICYCLE COMPONENT, HAVING AT LEAST ONE RELIEF AREA AND RELATED METHODS

RELATED APPLICATIONS

The present application is based upon provisional patent application Ser. No. 60/283,105 filed on Apr. 11, 2001, and the entire contents of which are incorporated herein by reference. The present application is also a continuation-in-part of U.S. patent application Ser. No. 09/658,509 filed on Sep. 8, 2000, now U.S. Pat. No. 6,945,135 which was based upon provisional patent application Ser. No. 60/153,159 filed on Sep. 9, 1999, the entire discloses of both of which are also incorporated herein by reference.

FIELD OF THE INVENTION

The present invention relates to the field of mechanical connectors and clamps, and, more particularly, to a clamp for connecting to an object, such as a bicycle component.

BACKGROUND OF THE INVENTION

A number of applications require connection or clamping to a cylindrical object, such as a tube, rod or shaft, for example. Examples of such are for clamping to the steering tube, bicycle seat tube, or handlebar of a bicycle.

Bicycles are widely used for transportation and recreation. A typical bicycle includes a rear wheel carried by a frame and a front wheel carried by a fork which, in turn, is rotatably connected to a forward portion of the frame. In particular, a steering tube is connected at its lower end to the fork and extends through a corresponding passageway defined in the forward portion of the frame. An upper portion of the steering tube is connected to a bicycle stem.

The bicycle stem includes a steering tube clamp portion which clamps to the upper end of the steering tube. A body portion extends generally forwardly and incline from the steering tube clamping portion and terminates at a handlebar clamp portion. The incline is generally upward for mountain biking and downward for road biking, as desired by the rider. Of course, the medial portion of the handlebar is connected to the handlebar clamp portion of the stem. The rider is thus able to steer the front wheel by turning the handlebar.

The bicycle stem is important for proper orientation and positioning of the rider relative to the bicycle. In addition, the stem is desirably relatively strong to avoid potentially catastrophic failure, and is also desirably lightweight to reduce the burden on the rider. Mountain or off-road biking can put especially high demands on the strength of the stem. Road bikes may also place high demands in terms of both required strength and being relatively lightweight on the bicycle stem.

The stem also desirably has relatively high torsional stiffness, that is, a resistance to allowing the handlebar to rotate as the rider pushes on one side while lifting on the other. If the torsional stiffness is too low, the rider's energy is more quickly and wastefully depleted in rotating the handlebar.

Bicycle stems can be made of several different materials that are both light in weight and have high strength properties. Recently, and in an effort to use more lightweight materials, bicycle stems and other bicycle components have been manufactured out of composite materials. The clamp used to secure such bicycle components typically includes two cylindrical halves or clamping members which can be urged together by a fastener, such as a bolt, for example, which extends along an axis defined by the cylindrical halves. More particularly, the cylindrical halves each include corresponding arcuate recesses which, when properly aligned, will press against an outer circumferential portion of the steering tube upon tightening of the bolt to thus clamp the bicycle stem to the steering tube. Such stems are shown, for example, in U.S. Pat. Nos. 5,687,616 and 5,842,385.

The outermost ends of the clamps may define contact points which bite into the bicycle components, thus forming dimples in bicycle components. These dimples are especially common in bicycle components made of more flexible materials, such as aluminum. Such deformations of the bicycle component may be undesirable for a number of reasons. For example, the deformations are aesthetically displeasing and can sometimes cause the clamp to seat within the dimples. When a clamp seats within the dimples good contact is not made with the bicycle object to be clamped. In cases where composite materials are used to form bicycle components, scoring of the bicycle component occurs when the clamp end portions dig into the bicycle component. This scoring is generally undesirable. Over time, the scoring may lead to more serious damage, such as cracks, which may eventually lead to catastrophic failure. Such composite bicycle components are often used on high-end road bicycles, for example. Of course, these same shortcomings extend to other similar clamping applications.

U.S. Pat. No. 3,868,193 to Schott discloses a clamp having portions with a smaller cross sectional area so as to improve bending flexibility. Therefore, when the clamp is tightened around the object to be clamped, it gives way, or bends. Therefore, it is the clamp that is deformed instead of the object being clamped. Unfortunately, this deformation of the clamp can also eventually lead to catastrophic failure of the clamp. Further, in cases where the object to be clamped is made of very brittle material, such as a composite material, the force necessary to deform or crack the material is not great and therefore any tightening of the clamp that allows for end portions of the clamp to bite into the object can still cause catastrophic failure of the object.

A bicycle stem including a handlebar clamping portion that tightens against a composite handlebar may cause cosmetic damage or scratching of the composite material if the clamp portions deform slightly during tightening of the fasteners. This may occur, for example, when opposing clamping portions are configured to define one or more pairs of opposing ends in a preclamped state. As the fasteners are secured and the opposing ends are drawn toward each other for the clamped state, the clamp portions may deform slightly and dig or bite into the composite material causing scratches or indentations in the surface.

U.S. Pat. No. 6,176,640 to Gonczi, for example, discloses an approach to overcome the scratching of a composite steering tube upon clamping. This patent discloses forming flats on the otherwise rounded outer surface of the composite steering tube. Accordingly, the opposing ends of a C-shaped clamp will not contact the steering tube at these flats when in the clamped state. Unfortunately, the overall contact area available for clamping is reduced and careful alignment may be required to ensure that the opposing ends are aligned with a flat.

SUMMARY OF THE INVENTION

In view of the foregoing background, it is therefore an object of the present invention to provide an object clamp that reduces a likelihood of damage, such as scratching, for example, during clamping.

This and other objects, features and advantages in accordance with the present invention are provided by an object clamp comprising clamp portions having recesses therein, and wherein one or more relief areas are provided in the recesses adjacent ends of the clamp portions to reduce the possibility of biting into the object being clamped to. More particularly, the clamp portions may have respective recesses therein collectively defining a generally circular cylindrical opening for receiving the object to be clamped, such as a bicycle component. The clamp portions may have respective ends defining at least one pair of opposing ends, and at least one fastener may be included for urging the at least one pair of opposing ends towards each other upon movement from a preclamped state to a clamped state. At least one of the recesses may have at least one relief area therein extending to at least one adjacent end in the preclamped state and being deflected into engagement with the object in the clamped state. Accordingly, the clamp portions can securely engage the object, and with a reduced likelihood of scratching or digging into the object.

Each relief area may define a discontinuity with adjacent portions of a respective recess in the preclamped state. For example, this discontinuity may be angularly spaced inward from the adjacent end in a range of about 4 to 60 degrees. In addition, the generally circular cylindrical opening can be defined by a main axis and a main radius extending therefrom. The relief area can be defined by a relief axis and a relief radius extending therefrom. The relief axis can be offset from the main axis and the relief radius can be less than or equal to the main radius.

In one class of embodiments, the object clamp can include first and second pairs of opposing ends. These pairs of ends can be separated by about 180 degrees, for example. In another class of embodiments, the object clamp can include a single pair of opposing ends.

The first and second clamp portions can have one or more pairs of aligned fastener receiving passageways therein for receiving respective fasteners. The object clamp can be a bicycle component clamp such as at either end of a bicycle stem, that is, for receiving a bicycle steering tube or a bicycle handlebar. The bicycle component could alternately be for a bicycle seat tube. Other applications for the clamp are also contemplated. The object clamp can further include a body portion connected to at least one of the clamp portions and extending outwardly therefrom.

Another aspect of the invention relates to a method for making the clamp. The method may include providing a plurality of clamp portions having respective recesses therein collectively defining a generally circular cylindrical opening for receiving an object to be clamped, and with the clamp portions having respective ends defining at least one pair of opposing ends. The method may also include providing at least one fastener for urging the at least one pair of opposing ends toward each other during movement from a preclamped state to a clamped state. Moreover, the method may also include forming at least one relief area in at least one of the recesses to extend to at least one adjacent end in the preclamped state and being deflected into engagement with the object in the clamped state.

Another aspect of the invention relates to a clamping arrangement comprising a composite fiber and resin object and a clamp connected thereto. The clamp may comprise a plurality of clamp portions having respective recesses therein collectively defining an opening receiving the composite fiber and resin object. The clamp portions may have respective ends defining at least one pair of ends. The clamp may also include at least one fastener for urging the at least one pair of ends toward each other during movement from a preclamped state to a clamped state. Moreover, at least one of the recesses may have at least one relief area therein extending to at least one adjacent end in the preclamped state and being deflected into engagement with the composite fiber and resin object in the clamped state.

Yet another aspect of the invention is directed to an object clamp comprising a tubular sleeve having at least one slotted opening therein defining a plurality of sleeve segments, wherein the sleeve segments have respective recesses therein collectively defining an opening for receiving an object to be clamped. The sleeve segments may have respective ends defining at least one pair of sleeve ends. The clamp may also include a plurality of clamp portions having respective recesses therein collectively defining an opening surrounding the tubular sleeve. The clamp portions may have respective ends defining at least one pair of clamp ends. In addition, the clamp may include at least one fastener for urging the at least one pair of clamp ends toward each other during movement from a preclamped state to a clamped state. Moreover, at least one relief area may be provided in at least one of the tubular sleeve and the clamp portions in the preclamped state and being deflected into engagement with adjacent portions in the clamped state.

BRIEF DESCRIPTION OF THE DRAWINGS

FIGS. 10, 11 and 12 are perspective, side and elevational views, respectively, of the steering tube clamp as used in the stem of FIG. 1.

FIG. 13 is an end view of a variation of the steering tube clamp as shown in FIGS. 10-12.

FIGS. 15, 16 and 17 are left and right side elevational, and top plan views, respectively, of a portion of the steering tube clamping portion of another embodiment of the bicycle stem in accordance with the invention.

FIG. 18 is a perspective view of an embodiment of a steering tube clamp member to be used in the bicycle stem embodiment shown in FIGS. 15-17.

FIG. 19 is a greatly enlarged cross-sectional view taken through the handlebar clamping portion and handlebar clamping member of the bicycle stem as show in FIG. 1.

FIGS. 33 and 34 are side elevational views of a portion of yet another embodiment of a bicycle stem secured to a handlebar and having relief areas in the inner clamp portion illustrated in a preclamped and a clamped state, respectively, according to the present invention.

DETAILED DESCRIPTION OF THE PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout. Prime and multiple prime notation are used to indicate similar elements in alternate embodiments.

Figure 1:
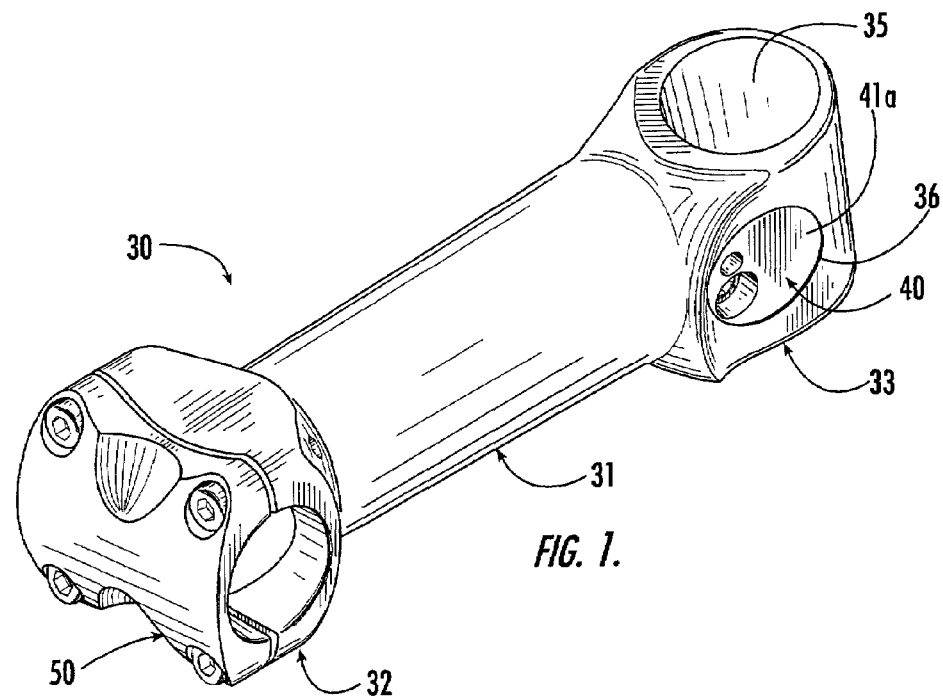
FIG. 1 is a perspective front view of a first embodiment of a bicycle stem in accordance with the present invention.
Figure 2:
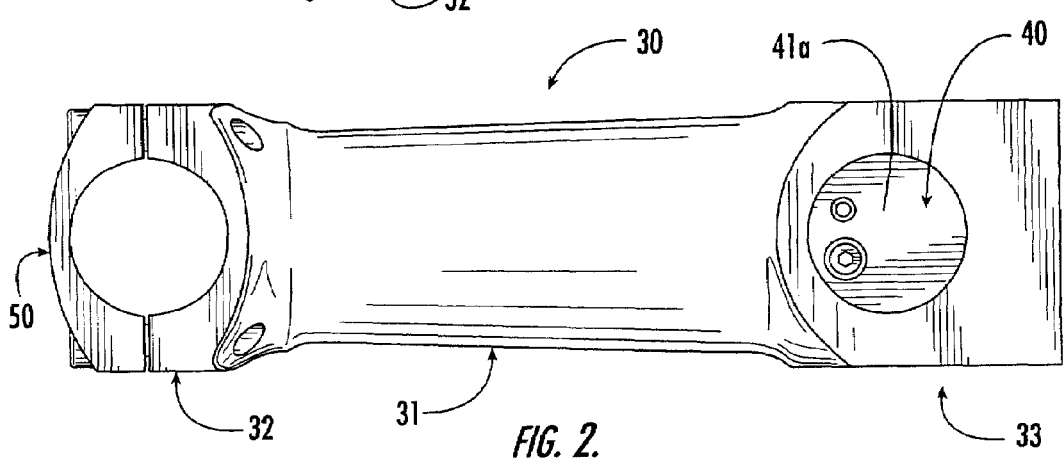
FIG. 2 is a left side elevational view of the stem as shown in FIG. 1.
Figure 3:
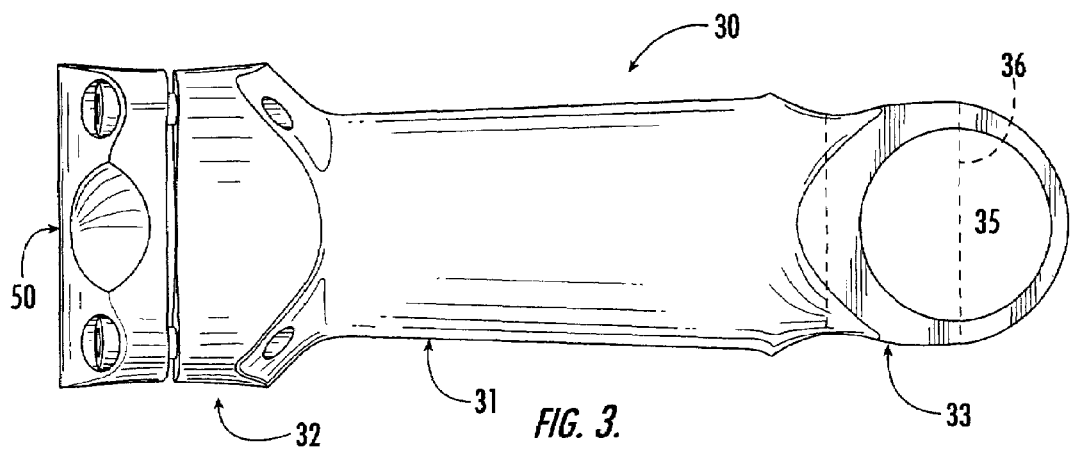
FIG. 3 is a top plan view of the stem as shown in FIG. 1.

Referring initially to FIGS. 1-3, a first embodiment of the bicycle stem 30 in accordance with the invention is now described. The bicycle stem 30 illustratively includes a body portion 31 having opposing first and second ends, a handlebar clamping portion 32 connected to the first end of the body portion, and a steering tube clamping portion 33 connected to the second end of the body portion. A handlebar clamping member 50 is removably secured to the handlebar clamping portion 32 as will be described below in greater detail.

In the illustrated stem 30 the body portion 31 is angled upwardly from the steering tube clamping portion 33. The stem 30 may be reversed when connected to a bicycle so that the body portion 31 angles downwardly from the steering tube clamping portion 33 as will be appreciated by those skilled in the art. For example, for mountain biking many riders may prefer the upward angle, while road bikers may prefer the downward arrangement.

In the illustrated embodiment, the body portion 31 has a tubular construction for reduced weight with a progressively increasing diameter from the first to the second ends. Of course, in other embodiments, the body portion 31 of the stem 30 could be made shorter or longer, and the body portion 31 could be perpendicular to the steering tube clamping portion 33. The body portion 31 could also have a constant diameter, or have other shapes, such as a block shape, as will also be appreciated by those skilled in the art.

The steering tube clamping portion 33 illustratively has a tubular shape defining a steering tube receiving passageway therethrough 35, and a clamp receiving passageway 36 (FIGS. 1 and 3) transverse to the steering tube receiving passageway and in communication therewith. By tubular is meant side walls having an opening or bore therein defining the steering tube receiving passageway 35, and the side walls need not have a uniform thickness in all contemplated embodiments. In some embodiments, the steering tube clamping portion 33, could have a rectangular, polygonal or other shape and still be considered as tubular as will be appreciated by those skilled in the art.

The steering tube clamping portion 33 desirably presents a smooth surface free of protrusions in the direction backward toward the rider. As discussed above in the Background, such protrusions as are common on many conventional stems may be contacted by a knee of a rider.

The body portion 31, handlebar clamping portion 32 and steering tube clamping portion 33 of the stem 30 may be integrally formed as a monolithic unit in some embodiments, thereby also increasing strength especially relative to welded stems. The material may be a metal, such as aluminum, magnesium, steel, or alloys thereof, or the material may be a plastic or composite material, such as carbon fiber, as will be appreciated by those skilled in the art.

Figure 4:
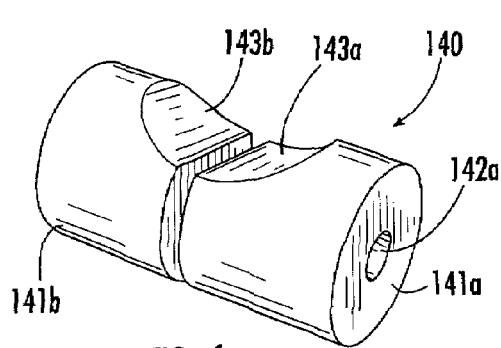
FIGS. 4 and 5 are perspective and side elevational views, respectively, of a steering tube clamp in accordance with the prior art.
Figure 5:
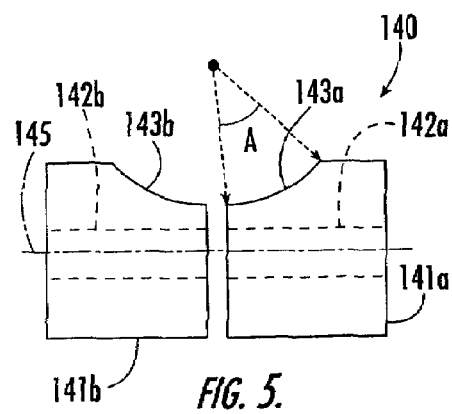

Referring now additionally to FIGS. 4-12, embodiments and aspects of the steering tube clamp 40 are now described. A prior art steering tube clamp 140 is shown in FIGS. 4 and 5 and includes a pair of cooperating clamp members 141a, 141b aligned in side-by-side relation. The prior art steering tube clamp 140 also includes respective portions defining an imaginary cylinder, and a recess, defined by respective recesses 143a, 143b, for the steering tube. Each clamp member 141a, 141b also has a fastener receiving passageway 142a, 142b therein to receive a single fastener, such as a bolt, for example. The fastener receiving passageways 142a, 142b are aligned along the axis 145 defined by the imaginary cylinder.

This prior art arrangement of the fastener receiving passageways 142a, 142b along the axis 145 results in a relatively shallow recess provided by the combination of recesses 143a, 143b. For example, this shallow arrangement may provide contact of one recess 143a of less than about 40 degrees for the angle A as shown in FIG. 5. The total clamp contact onto the steering tube is then less than about 80 degrees. This may result in a weak connection to the steering tube and/or damage to the steering tube, for example.

As shown in the embodiments of the invention in FIGS. 6-12, the stem 30 in some embodiments advantageously includes a steering tube clamp 40, 40' 40" with cooperating clamp members 41a, 41b; 41a', 41b'; 41a", 41b" aligned in side-by-side relation and comprising respective portions defining an imaginary cylinder and a recess therein for the steering tube. The recesses are defined by the individual recesses 43a, 43b; 43a', 43b'; 43a", 43b" as will be appreciated by those skilled in the art. Moreover, each clamp member 41a, 41b; 41a', 41b'; 41a", 41b" also has at least one fastener receiving passageway therein 42a, 42b, 42c, 42d; 43a', 43b'; 43a", 43b" offset a predetermined distance from an axis 45, 45', 45" defined by the imaginary cylinder.

The arrangement of the offset is also illustratively in the direction away from the recess for the steering tube. This configuration provides for a greater area and/or angle of contact between the steering tube clamp 40, 40', 40", and the steering tube. Many of the disadvantages of the prior art steering tube clamp 140 are overcome in accordance with this aspect of the present invention.

The offset may range from several millimeters to 10 or more millimeters depending on the size of the steering tube and other considerations as will be appreciated by those skilled in the art. The offset permits the angle of contact provided by a recess of a clamp member to be greater than about 45 degrees in some embodiments, greater than about 60 degrees in other embodiments, and even greater than 90 degrees in other preferred embodiments. In other words, the recesses may be greater than 90, 120 and even 180 degrees. While prior art clamps 140 may have had a tendency to damage or deform the steering tube from proper roundness, the steering tube clamp 40, 40', 40" in accordance with the invention may actually enhance the roundness of a steering tube that is out of round, such as caused by prior use of a conventional steering tube clamp 140, or from a tube that is out-of-round from the factory.

Figure 6:
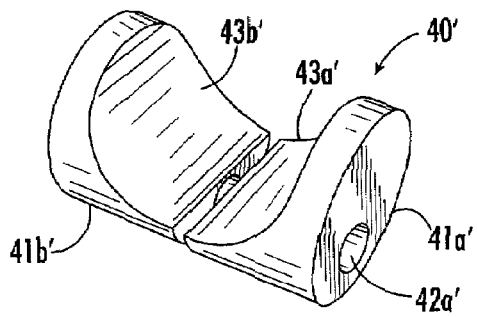
FIGS. 6 and 7 are perspective and side elevational views, respectively, of an embodiment of a steering tube clamp in accordance with the present invention.
Figure 7:
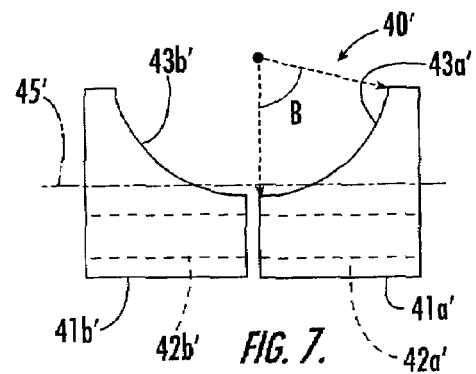

Referring now more particularly to FIGS. 6 and 7, the steering tube clamp 40' includes only a single pair of aligned fastener receiving passageways 42a', 42b' to receive a single fastener, such as a bolt, not shown. In other words, one of the fastener receiving passageways may be threaded and the other may include a stepped diameter to accommodate the enlarged bolt head as will be appreciated by those skilled in the art. Other types of the fastener are also contemplated by the present invention.

In this embodiment of the steering tube clamp 40' the ends of the clamp members 41a', 41b' may be considered as defining circles. Thus the imaginary cylinder defined by the steering tube clamp members 41a', 41b" is essentially a circular cylinder defined by the perimeter portions of the ends of the clamp members in the illustrated embodiment. A relatively large contact angle B is thus defined by the steering tube clamp members 41a', 41b'. Other forms of imaginary cylinders are also contemplated by the present invention, including those having a cross-sectional shape in the form of a rectangle, square, ellipse, and/or polygon, or other shape, as long as such a shape defines an axis from which the fastener receiving passageways are offset.

Figure 8:
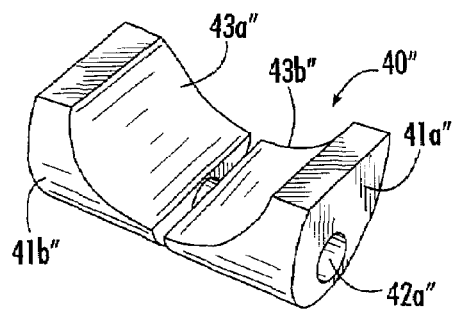
FIGS. 8 and 9 are perspective and side elevational views, respectively, of another embodiment of a steering tube clamp in accordance with the present invention.
Figure 9:
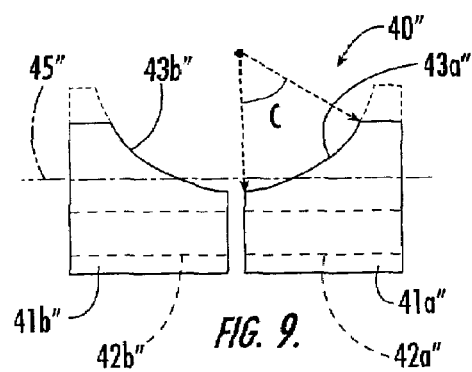

Referring now more particularly, to the steering tube clamp 40", shown in FIGS. 8 and 9, another embodiment or variation is explained. In this variation, end portions of the clamp members 41a", 41b" are each cut or truncated along a plane intersecting the imaginary cylinder as will be readily appreciated by those skilled in the art. In other words, cut-off wing portions are formed at the ends of the clamp members 41a", 41b". A somewhat smaller contact angle C is provided as compared to the steering tube clamp embodiment 40' discussed above with reference to FIGS. 6 and 7, however, the available contact angle C is still greater than the angle A of the prior art steering tube clamp 140.

Referring now briefly again to FIGS. 10-12, this embodiment of the steering tube clamp 40 is similar to the embodiment of the steering tube clamp 40' shown in FIGS. 6 and 7. The steering tube clamp 40 has a profiled shape on the outer end surfaces of each clamp member 41a, 41b to match the curvature of the adjacent portions of the steering tube clamping portion 33 as perhaps best seen in FIG. 1.

In addition, the steering tube clamp 40 includes two fasteners, in the form of bolts 46a, 46b (FIG. 10) arranged in opposite directions. Each bolt 46a, 46b may have an enlarged head and a threaded shaft extending outwardly therefrom. The head may include a recess extending inwardly from an end surface that is keyed, such as to permit turning via an Allen or Torx tool, for example.

In other embodiments, more than two fasteners may be used, and their directions need not be opposing. The dual bolt opposing arrangement does provide some advantages in terms of symmetry, ease of manufacture, and perhaps easier tightening of the fasteners as will be appreciated by those skilled in the art. Of course, using a plurality of fasteners may provide greater holding strength, as well as provide redundancy in the event one of the fasteners fails, becomes loose, or is not properly tightened initially Referring briefly to FIG. 13, a variation of the steering tube clamp 40''' is shown in end view, wherein end portions are truncated along a plane parallel to the axis 45'''. This is similar to the steering tube clamping member 40" shown in FIGS. 8 and 9. The dual fasteners 46a''', 46b''', are also similar to the steering tube clamp 40 shown in FIGS. 10-12. Accordingly, the steering tube clamp 40''' needs no further description herein.

Figure 14A:
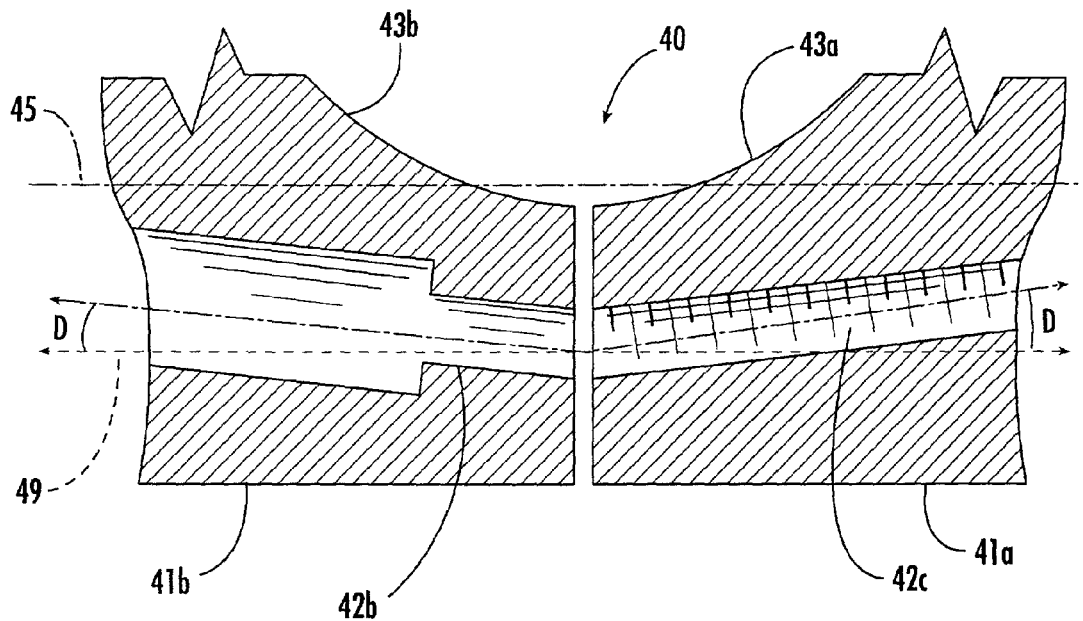
FIGS. 14A and 14B are greatly enlarged longitudinal cross-sectional views of the steering tube clamp as shown in FIGS. 10-12 illustrating the canting angle feature.
Figure 14B:
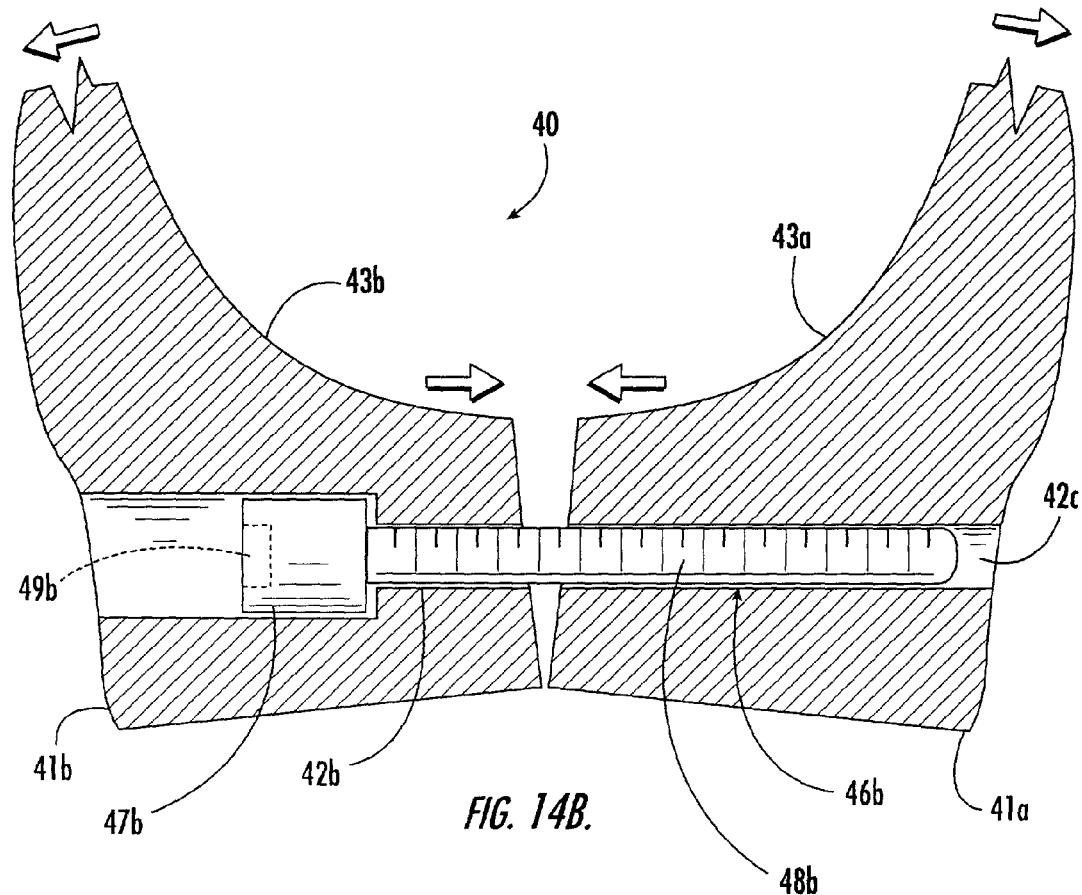
Figure 20:
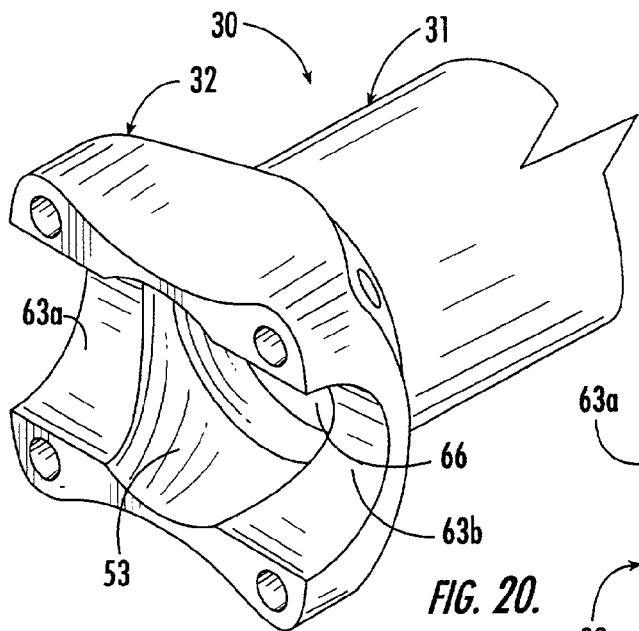
FIGS. 20 and 21 are perspective and end views, respectively, of the handlebar clamping portion of the bicycle stem as shown in FIG. 1 with the handlebar clamp removed for clarity.
Figure 21:
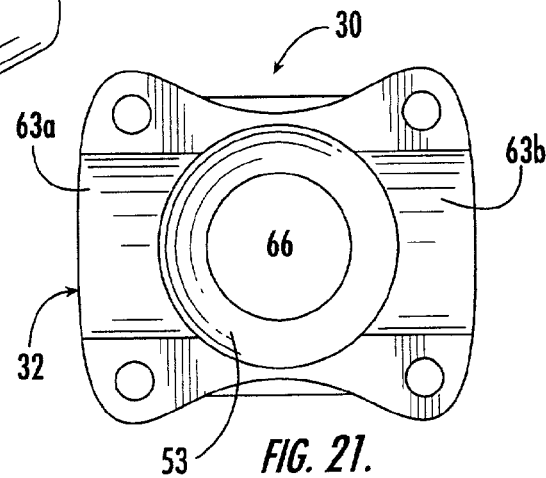
Figure 22:
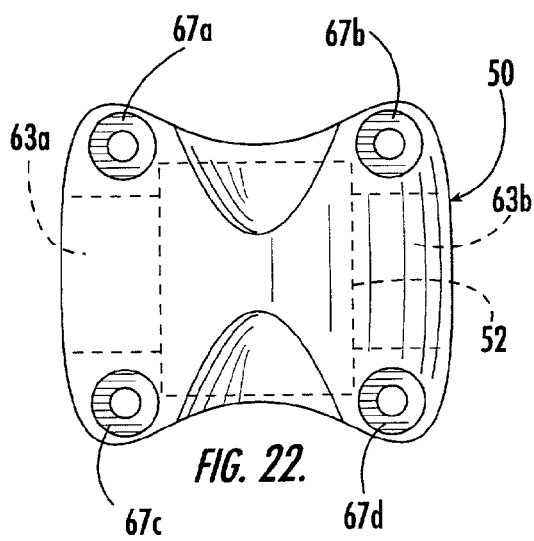
FIGS. 22 and 23 are top plan and bottom plan views, respectively, of the handlebar clamp member as shown in FIG. 1.
Figure 24:
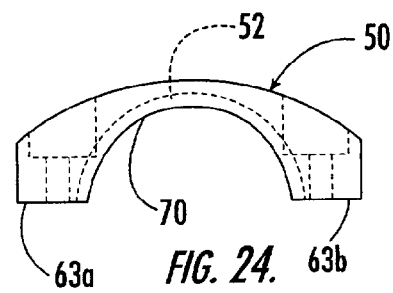
FIGS. 24 and 25 are side and end elevational views, respectively, of the handlebar clamp member as shown in FIG. 1.
Figure 23:
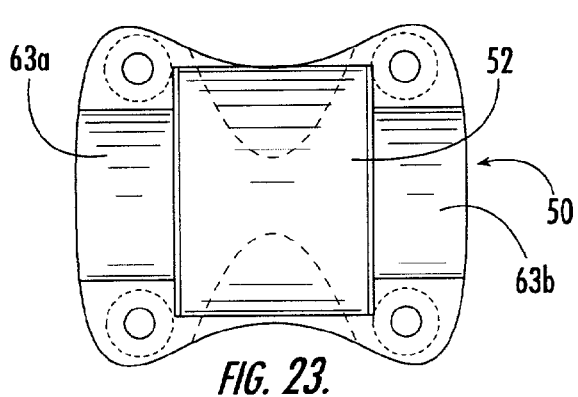
Figure 25:
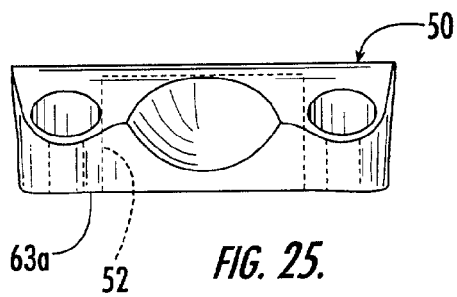

Referring to FIG. 11 and additionally to the enlarged and exaggerated cross-sectional views of FIGS. 14A and 14B, yet another advantageous aspect of the steering tube clamp 40 of the bicycle stem 30 is described. As shown in FIG. 14A, the steering tube clamp 40 illustratively includes a set of fastener receiving passageways 42b, 42c which are canted at a predetermined angle D from parallel to the axis 45 of the imaginary cylinder. The dashed line 49 indicates a parallel line to the axis 45. In other words, in the position shown in FIG. 14A, the passageways 42b, 42c define a shallow V-shape.

This canting allows the fasteners to be tightened with less likelihood of binding as outer portions of the clamp members 41a, 41b engage the steering tube and tend to rotate the outer portions of the clamp members outwardly as the lower portions of the clamp members themselves are being drawn together as shown in FIG. 14B. In the illustrated embodiment, the fastener is in the form of a bolt 46b having an enlarged head 47b and a threaded shaft 48b extending outwardly therefrom. A keyed recess 49b is provided in the end of the bolt head 47b.

For example, the predetermined angle D may be in a range of about one-half to five degrees and, more preferably about one to three degrees. One and one-half degrees for the canting angle D has also been found satisfactory for some embodiments. Although two sets of fastener receiving passageways are shown in the embodiment of the steering tube clamp 40, this canting concept is applicable to a single set or more than two sets.

The same or equivalent effect to canting the fastener receiving passageways at the predetermined angle D may be achieved by changing the outer shape of the clamping members 41a, 41b to be canted as will be appreciated by those skilled in the art.

As will be readily appreciated by those skilled in the art, a number of the advantageous features of the invention may be used independently or in combination. For example, the multiple fasteners may be used with or without the offset. The canting of the angle of the fastener receiving passageways may also be used alone, or in combination with other features. The provision of the recess to extend greater than a predetermined angular amount, can also be used alone or in combination with other features.

Turning now to FIGS. 15-18, another variation of the bicycle stem 30' is now described. In this variation, only a single movable clamping member 41a' is used, and the other mating clamping member is in effect provided by integrally formed opposing wall portions 41b' of the steering tube clamping portion 33'. The movable clamp member may be either on the right or lefthand side as will be appreciated by those of skill in the art. Of course, these opposing wall portions 41b" would also include the fastener receiving passageways 42b', 42d' as shown in the illustrated embodiment, and as will be appreciated by those skilled in the art.

In this embodiment, the clamping member 41a' is like the clamping member 41a used in the steering tube clamp 40 as shown in FIGS. 10-12. In other embodiments, the clamping member could have other configurations as also described herein. Accordingly, the clamping member 41a' needs no further description, nor do the other elements of the stem 30' shown in FIGS. 15-18.

Turning now to FIGS. 19 to 25 other advantageous features of the stem 30 are further described, particularly as relating to the handlebar clamping portion 32 and its associated handlebar clamp member 50. In particular, a conventional handlebar 60 as illustrated includes a pair of nominal diameter tubular portions 61a, 61b connected together at a central gripping or clamping portion 62. Moreover, the gripping or clamping portion 62 may be tapered, such as to present an enlarged diameter or slightly larger diameter portion 63 at a medial position thereof. Attempting to clamp uniformly across the entire extent of the tapered or enlarged diameter portion 63 may present difficulties, and strength and/or torsional rigidity of the stem may then be compromised.

The illustrated stem 30 includes the handlebar clamping member 50 which cooperates with the handlebar clamping portion 33 to clamp the bicycle handlebar 60 therebetween. The handlebar clamping member 50 may be secured by one or more removable fasteners so as to be completely removable from the handlebar clamping portion 32 in some embodiments, to thereby facilitate installation of the handlebar 60.

In some prior art stems, the handlebar clamp is defined by a single slot in a tube that can be slightly opened to receive the handlebar. Unfortunately, the handlebar must then be carefully and painstakingly threaded through the small opening. In addition, hardware attached to the handlebar may need to be removed from the handlebar. Accordingly, one advantageous feature of the illustrated stem 30 is that the clamping member 50 may be completely removed to facilitate installation of the handlebar.

The handlebar clamping member 50 and the handlebar clamping portion 32 have respective cavities 53, 52 in respective medial portions thereof to accommodate the enlarged diameter medial portion 63 of the handlebar 60. The handlebar clamping member 50 in the illustrated embodiment has a generally rectangular shape with a semi-cylindrical recess 70 (see, e.g. FIG. 24) formed therein for receiving and engaging the handlebar 60. The semi-cylindrical recess 70 and medial cavity 63 thus define two arcuate contact bands or areas 63a, 63b for tightly engaging the handlebar 60 at spaced-apart locations. Indeed these spaced-apart contact bands 63a, 63b illustratively extend to the outer edges of the stem 30. Similarly, the handlebar clamping portion 32 illustratively includes a semi-cylindrical recess therein, which, in combination with its medial cavity 53, defines a corresponding pair of arcuate contact bands or areas 63a, 63b which are also spaced from one another to the edges of the stem 30. Accordingly, a rigid and strong connection can be made from the stem 30 to the handlebar 60, such as to reduce torsional rotation during riding, which would otherwise occur to sap the rider's energy.

In the illustrated embodiment, the body portion 31 has a tubular shape with a hollow interior 66. The cavity 53 of the handlebar clamping portion 32 has an opening therein in communication with the hollow interior 66 of the body portion. Accordingly, weight can be reduced without compromising strength.

The handlebar clamping member 50 and the handlebar clamping portion 32 may both have generally rectangular shapes overlying one another. In these embodiments, respective fasteners 67a-67d (FIG. 22) secure the corners of the handlebar clamping member 50 and the handlebar clamping portion 32 together. The handlebar clamping portion 32 may include threaded passageways, and the handlebar clamping member 50 may include corresponding passageways, including enlarged portions to receive the bolt heads as shown in the illustrated embodiment. Of course, this configuration of fasteners 67a-67d could be reversed. Fewer or greater than four fasteners could also be used in other embodiments. In addition, the cavities 53, 52 may be advantageously used in stem configurations, such as the single slot handlebar clamp stem discussed above, and others, as will be appreciated by those skilled in the art.

Figure 26:
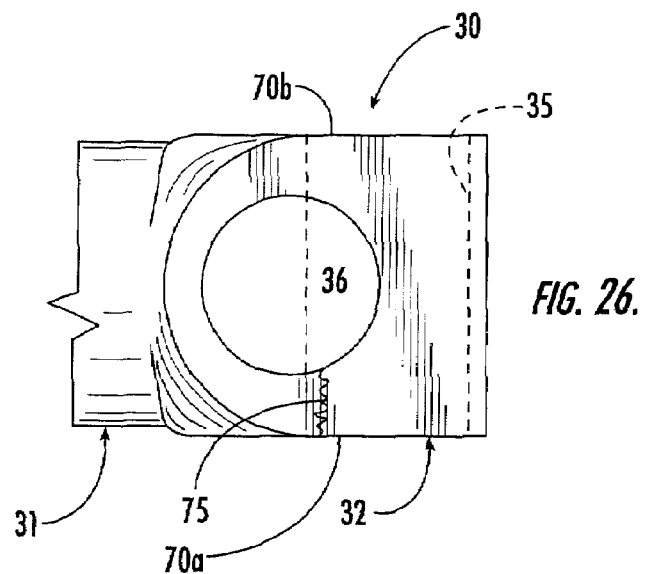
FIGS. 26 and 27 are left and ride side elevational views of the steering tube portion of the bicycle stem as shown in FIG. 1 illustrating the maintenance failure indication.
Figure 27:
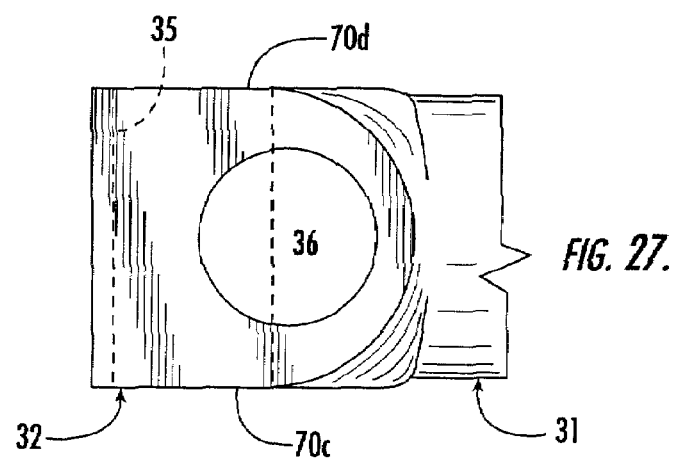
Figure 28:
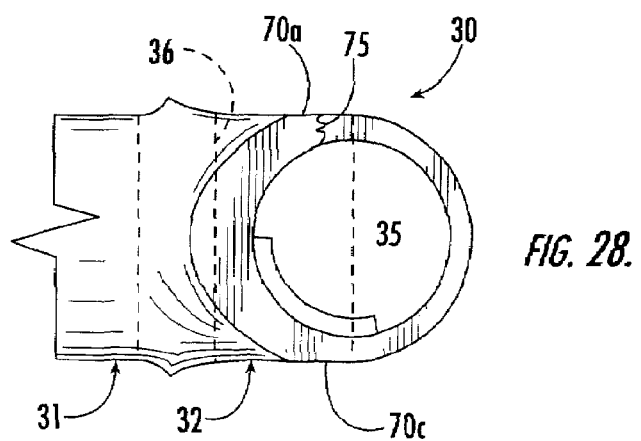
FIG. 28 is a bottom plan view of the bicycle stem as shown in FIGS. 26 and 27.

Turning now additionally to FIGS. 26 to 28 another aspect of the stem 30 in accordance with the invention is now described. In accordance with this aspect, the bicycle stem 30 comprises a body portion 31, a handlebar clamping portion 32 (FIGS. 1-3) and a steering tube clamping portion 33 having relative strengths so that a predetermined portion, such as a leg 70a of the steering tube clamping portion 32, will crack first to thereby provide a visual maintenance indication to a user. As described above the steering tube clamping portion 32 may have a tubular shape defining a steering tube receiving passageway 35 therethrough. The clamp receiving passageway 36 is transverse to the steering tube passageway 35 and in communication therewith. The steering tube clamping portion 32 may thus comprise four legs 70a-70d defined by the steering tube receiving passageway 35 and the clamp receiving passageway 36.

The relative strengths may be configured so that one of the legs, typically a lower leg, such as the illustrated lower leg 70a will form a crack 75 first. Of course, the crack 75 provides a visual indication to the user to repair or replace the stem 30. The other three legs 70b-70d are preferably sufficiently strong to maintain a connection to the steering tube even with one of the legs cracked. Thus the likelihood of unexpected complete or catastrophic failure of the stem is significantly reduced.

By forming a crack 75 first is generally intended to mean forming a crack based upon material fatigue, as opposed, for example, to ultimate breaking strength. Fatigue is typically more of a problem as a bicycle is used over and over again with the rider providing alternating rotational loads on the handlebar. For example, an aluminum embodiment of the stem 30 has been tested to withstand upwards of 80,000 load cycles before the first leg will crack. The test included providing alternating loads of ±92 pounds of force on a test handlebar spanning eighteen inches from end-to-end, and with the stem in the middle. It is further noted that the torsional rigidity of the stem 30 is also very high. For example, greater than 100 foot-pounds of torque may be needed for a one degree deflection of the handlebar.

Turning now to FIGS. 29-46 other aspects of the invention are now described. In particular, these aspects address the difficulty described in the Background of the Invention section of deforming the clamping portions and causing biting into and scratching the object, such as a composite handlebar, being clamped to. As the clamping portions are drawn together, they may deform slightly from a nearly perfect circle, and the deformed ends may bite into the handlebar. For metallic handlebars, this may cause only minor cosmetic scratches. For a composite handlebar, even cosmetic scratches may be undesirable as such may at least be perceived as ultimately causing complete failure.

Referring now to initially to FIGS. 29-32, the illustrated bicycle stem 150 includes first and second opposing clamp portions or inner and outer clamp portions 152, 154. A body portion 151 extends from the inner clamp portion 152. The first and second clamp portions 152, 154 have respective recesses 153, 155 therein cooperatively defining a generally circular cylindrical opening 156 for receiving an object, such as the illustrated composite tubular handlebar 100 to be clamped to. The first and second opposing clamp portions 152, 154 illustratively have respective ends defining two pairs of opposing ends 152a, 154a and 152b, 154b. In the illustrated stem 150 the first and second pairs of ends 152a, 154a and 152b, 154b are separated by about 180 degrees, although in other embodiments the separation may be different.

The bicycle stem 150 also includes fasteners 170a, 170b (only two of which of a total of four are shown in the side elevational views) for urging the pairs opposing ends 152a, 154a and 152b, 154b towards each other when moved between a preclamped state and a clamped state. In the preclamped state, the clamp portions 152, 154 may be generally relaxed, that is, under no external forces. In the clamped state, wherein the fasteners 170a, 170b are torqued to the desired value, the clamp portion ends 152a, 154a and 152b, 154b may desirably provide about the same clamping pressure as the rest of the clamp portions to thereby prevent digging into the stem 150, for example. The fasteners can advantageously be provided by threaded bolts, for example, or other types of fasteners. The fasteners 170a, 170b are received in aligned fastener receiving passageways 172a, 174a and 172b, 174b.

Figure 29:
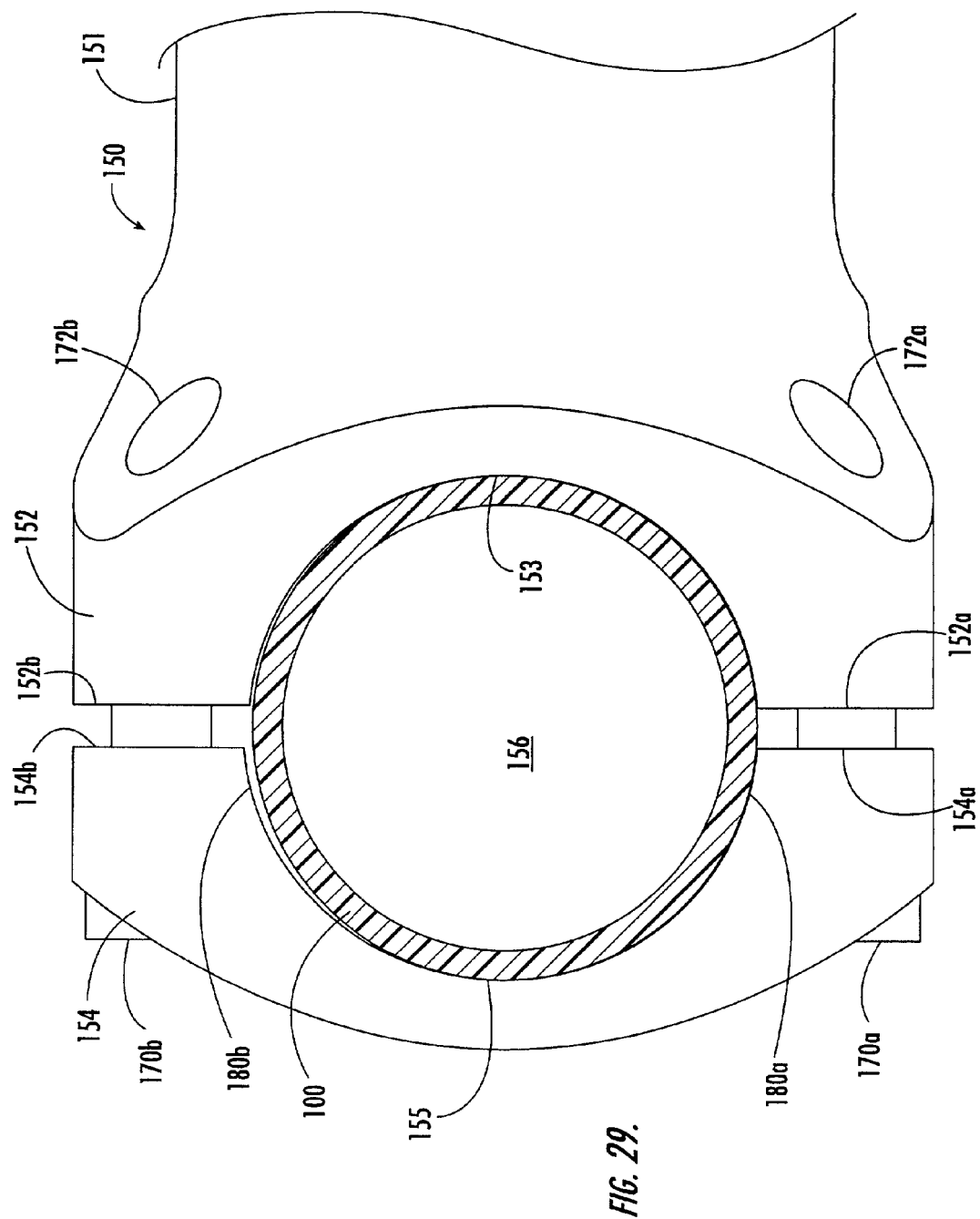
FIGS. 29 and 30 are side elevational views of a portion of another embodiment of a bicycle stem secured to a handlebar and having relief areas in the outer clamp portion illustrated in a preclamped and a clamped state, respectively, according to the present invention.
Figure 30:
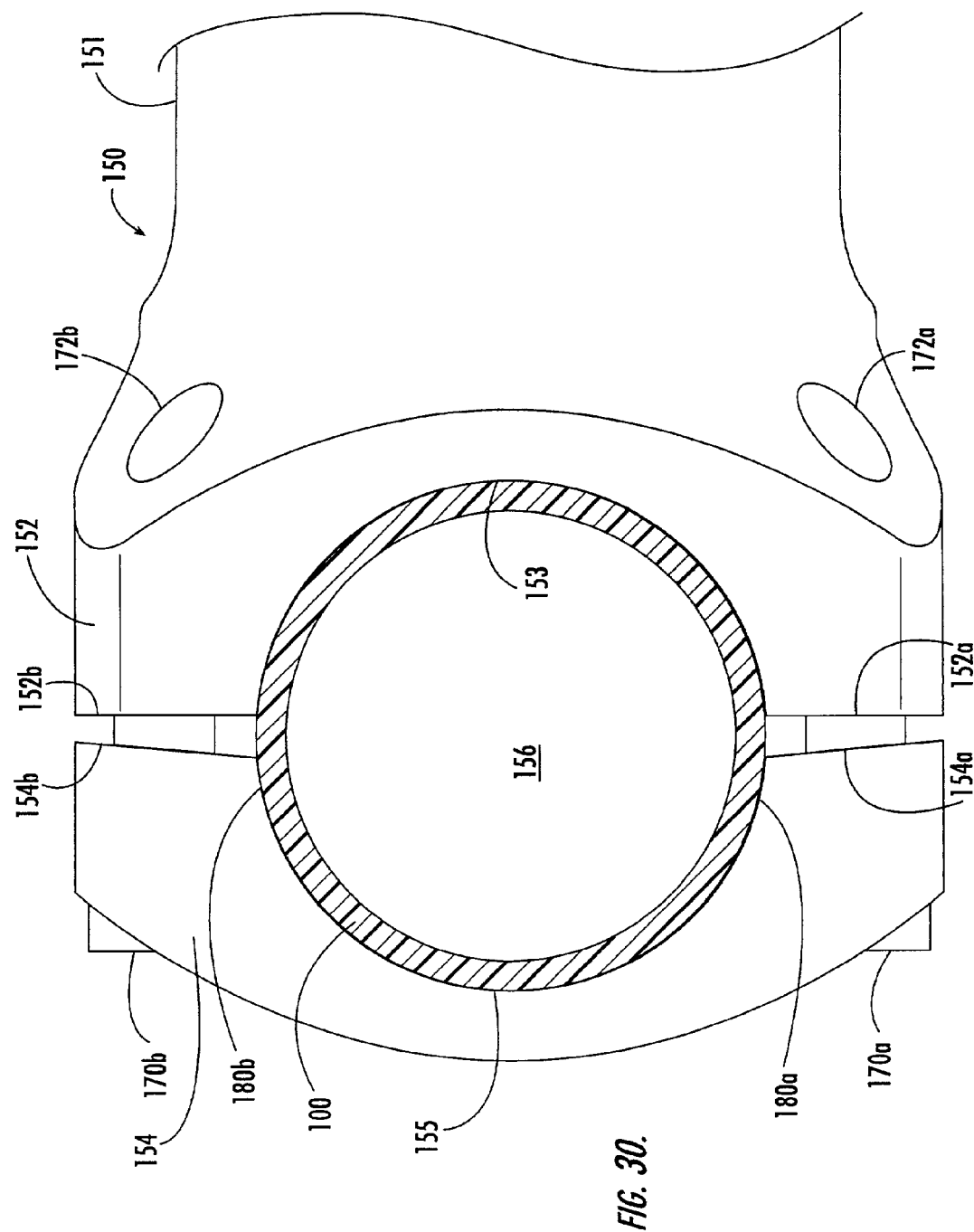
Figure 32:
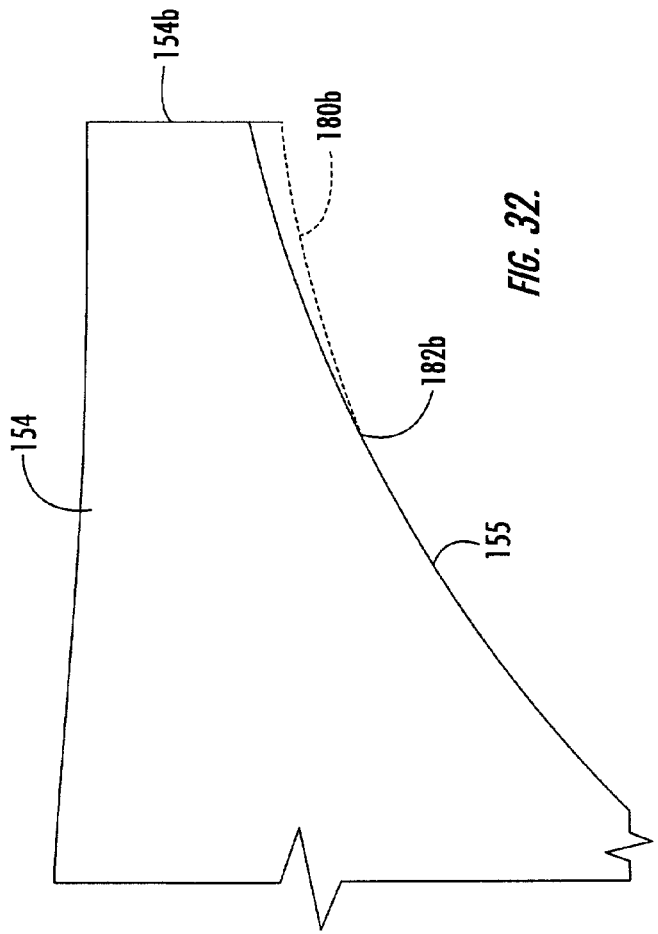
FIG. 32 is an enlarged view of the relief area shown in the upper portion of FIG. 31.
Figure 31:
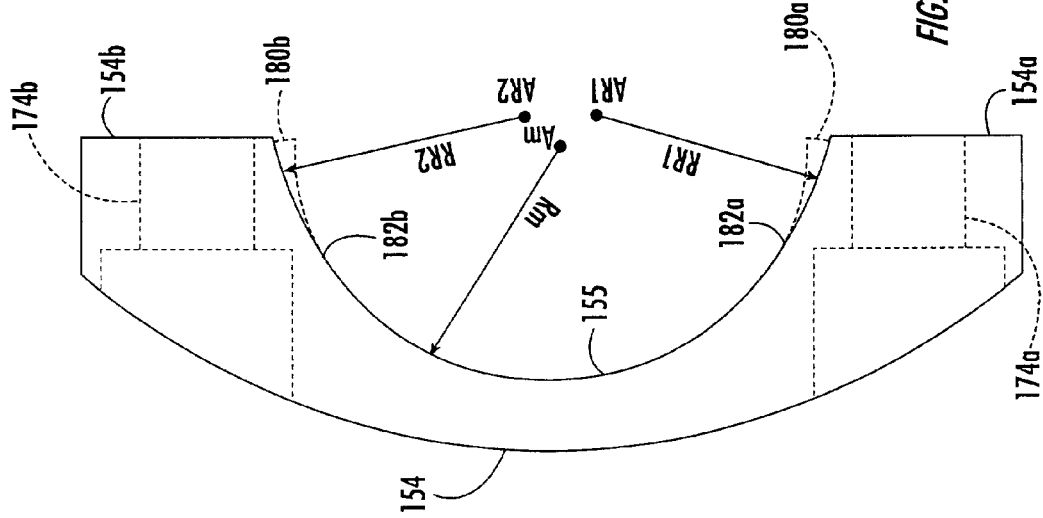
FIG. 31 is a side elevational view of the clamp portion with the relief areas therein as shown in FIGS. 29 and 30, and with the handlebar removed for clarity.

As perhaps best illustrated in FIGS. 31 and 32, the outer clamp portion 154 has a pair of relief areas 180a, 180b in the recess 155 and extending to the respective ends 154a, 154b thereof. The bicycle stem 150 is illustrated in FIG. 29 in a preclamped state wherein the relief areas 180a, 180b of the outer clamp portion 154 are visible. As seen in FIG. 30, the relief areas 180a, 180b are deflected into engagement with the handlebar 100 when the stem 150 is in the clamped state. As will be readily appreciated by those skilled in the art and as used herein, deflected into engagement does not mean that the entire relief area is necessarily deflected into engagement, as such will depend upon the shape of the relief area, the degree of fastener tightening, and/or the flexibility of the clamp material, for example.

As shown perhaps best in the greatly enlarged view of the relief area 180b of FIG. 32, the relief area 180b illustratively defines a discontinuity 182b with adjacent portions of the recess 155. The discontinuity may be generally angularly spaced inward from the end 154b in a range of about 4 to 60 degrees. This advantageously allows the relief area 180b to be deflected into engagement with the handlebar 100 without biting into the handlebar. The lower relief area 180a also defines a similar discontinuity 182a. Those of skill in the art will appreciate that in some embodiments, these discontinuities 182a, 182b may be so slight as to be almost imperceptible.

Referring now more particularly to FIG. 31, other aspects of the bicycle stem 150 are now described. The generally circular cylindrical opening 156 is defined by a main axis $A_M$ and a main radius $R_M$ extending therefrom. The main radius $R_M$ has a size corresponding to the handlebar 100. For example, the main radius $R_M$ may be about ½ inch. The relief areas 180a, 180b are illustratively defined by respective relief axes $A_{R1}$, $A_{R2}$ and relief radii $R_{R1}$, $R_{R2}$ extending therefrom. The relief axes $A_{R1}$, $A_{R2}$ are also offset from the main axis $A_M$ by respective offset distances. In the illustrated embodiment, these offset distances are the same for each relief area 180a, 180b, however, in other embodiments, these distances could be different from one another. In addition, it can be appreciated that the offsets are diagonally arranged from the main axis $A_M$ in the illustrated embodiment, although other configurations are also contemplated.

It may also be desirable to remove a portion of each end 154a, 154b of the outer clamp portion 154 which would otherwise define 180 degrees of the opening 156. For example, about 0.060 inch may be removed from each of the ends. Accordingly, a slight gap may remain upon tightening of the fasteners 170a, 170b as shown in the illustrated embodiment.

Forming the relief areas 180a, 180b based upon offset axes $A_{R1}$, $A_{R2}$ permits conventional boring tools to be used as will be appreciated by those skilled in the art. Of course, other tools may also be used to form the relief areas 180a, 180b, and, indeed, the relief areas can take other shapes as will be appreciated by those skilled in the art. For example, each relief area 180a, 180b may be defined by a straight segment, by a parabolic segment, spline segment, or combinations of these types of segments as will also be appreciated by those skilled in the art.

The relief radii $R_{R1}$, $R_{R2}$ and the main radius $R_M$ are illustratively the same, but can be different in other embodiments. This permits the same boring bar to be used to form the recess 155, as well as the relief areas 180a, 180b. This can be done by slight repositioning before forming each radius. As will be appreciated by those skilled in the art, in other embodiments the relief radii can be less than the main radius.

Figure 34:
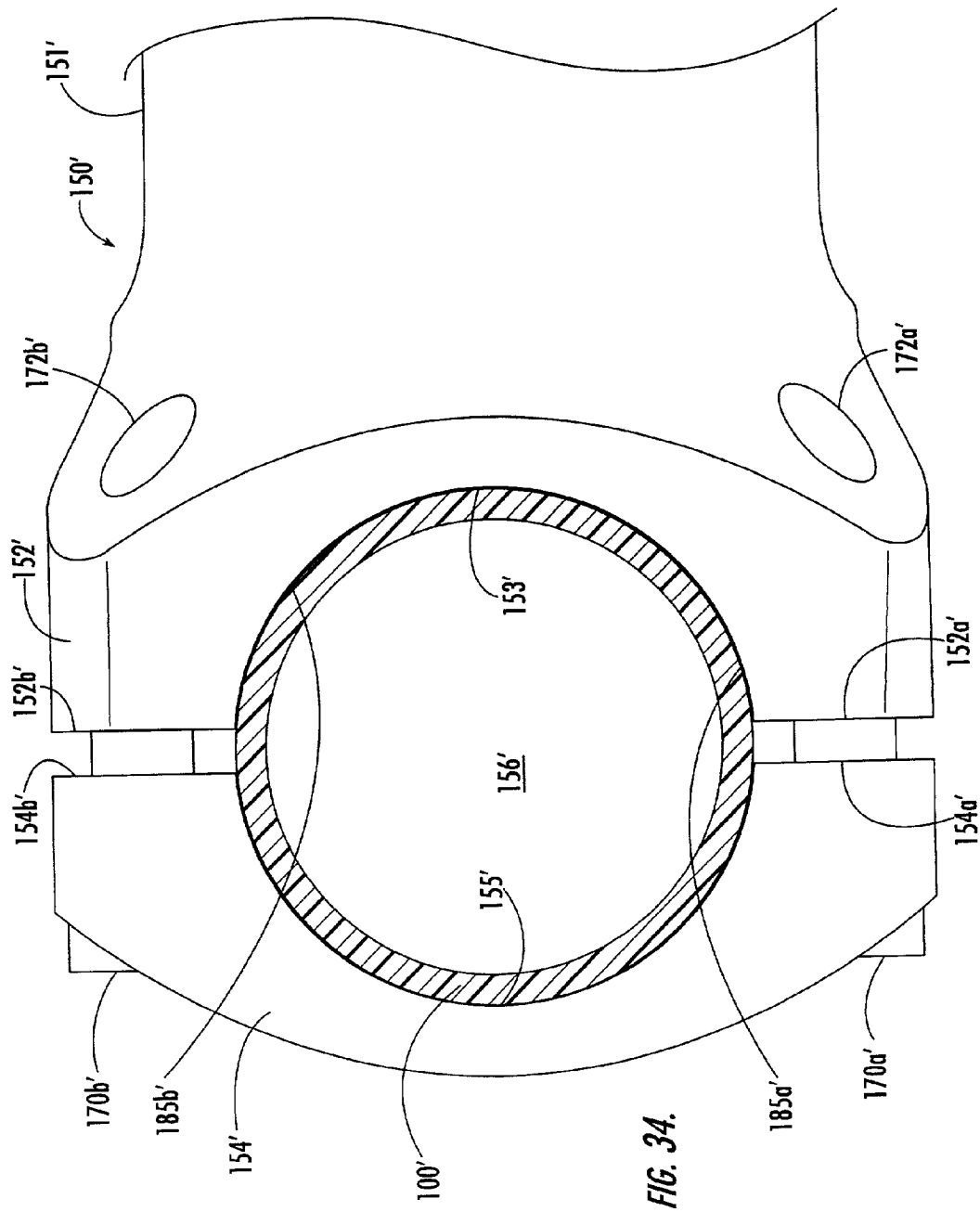

Turning now additionally to FIGS. 33 and 34, another variation of the bicycle stem 150' is now described. The illustrated bicycle stem 150' includes relief areas 185a', 185b' on the inside clamp portion 152' rather than the outside clamp portion 154' as described above for the embodiments shown in FIGS. 29-32. The preclamped state for the bicycle stem 150' is shown in FIG. 33, and the clamped state is shown in FIG. 34.

Those of skill in the art will recognize that in yet other embodiments of the invention, the relief areas could be provided on both clamp portions. Typically the relief areas are provided on the clamp portion or portions which is/are subject to slight deformation as the fasteners are tightened and the clamp is moved to the clamped position. Indeed, in some embodiments, only a single relief area may be needed. The other elements of the bicycle stem 150' are indicated with prime notation and are similar to those described above with reference to FIGS. 29-32 as will be readily appreciated by those skilled in the art. These similar elements need no further discussion herein.

Figure 35:
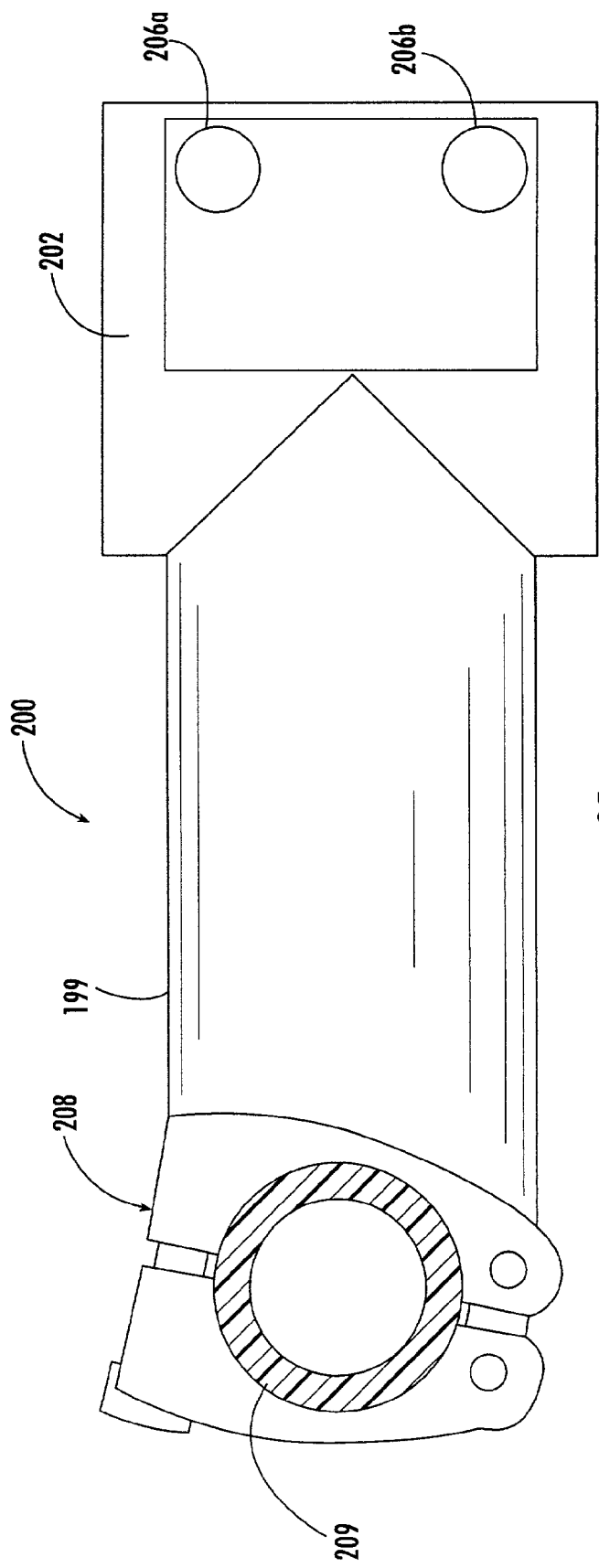
FIG. 35 is side elevational view of another bicycle stem embodiment in accordance with the present invention.
Figure 36:
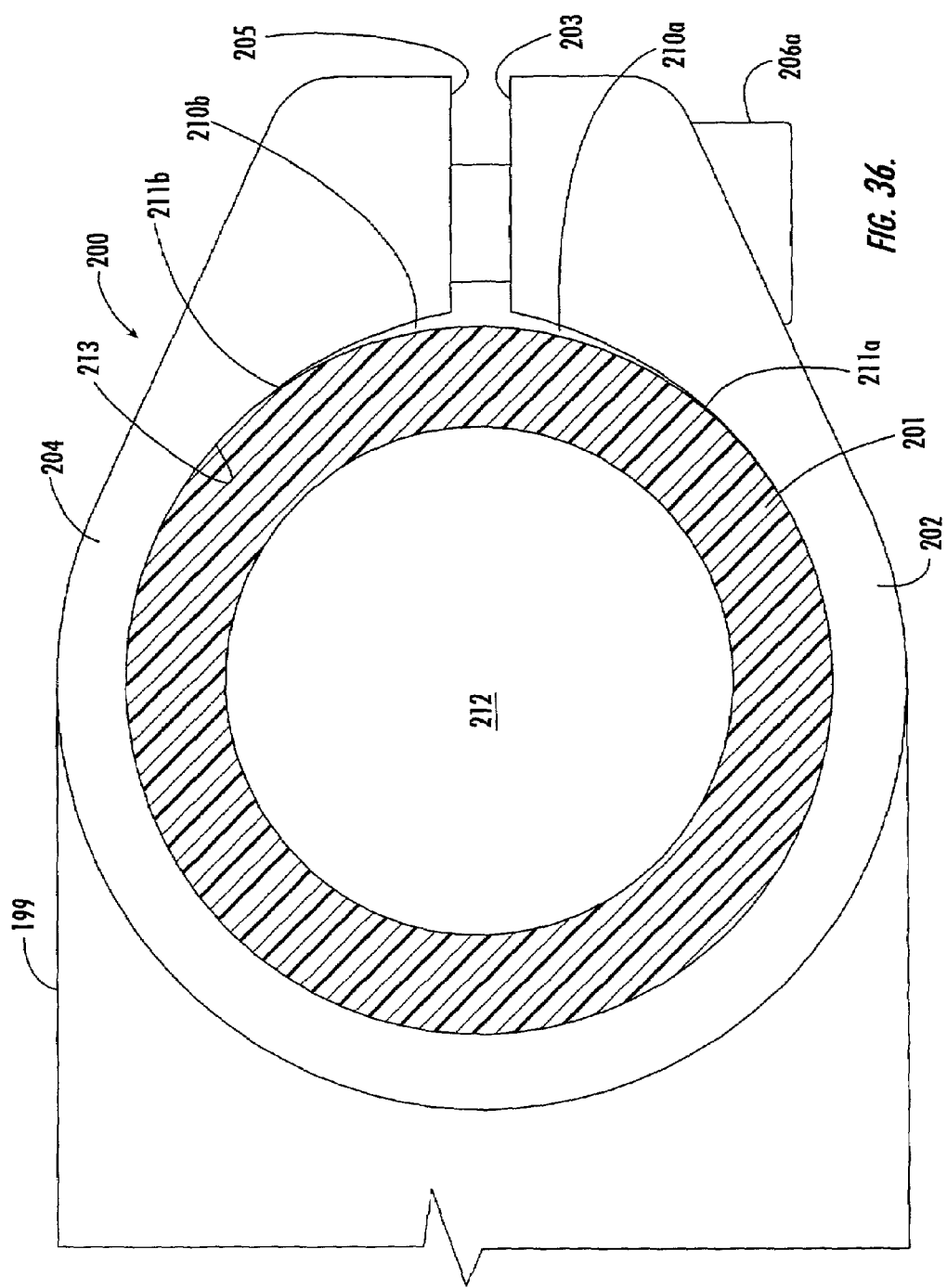
FIGS. 36 and 37 are enlarged top plan views of the steering tube clamp of the bicycle stem as shown in FIG. 35 and illustrated in a preclamped and a clamped state, respectively.
Figure 37:
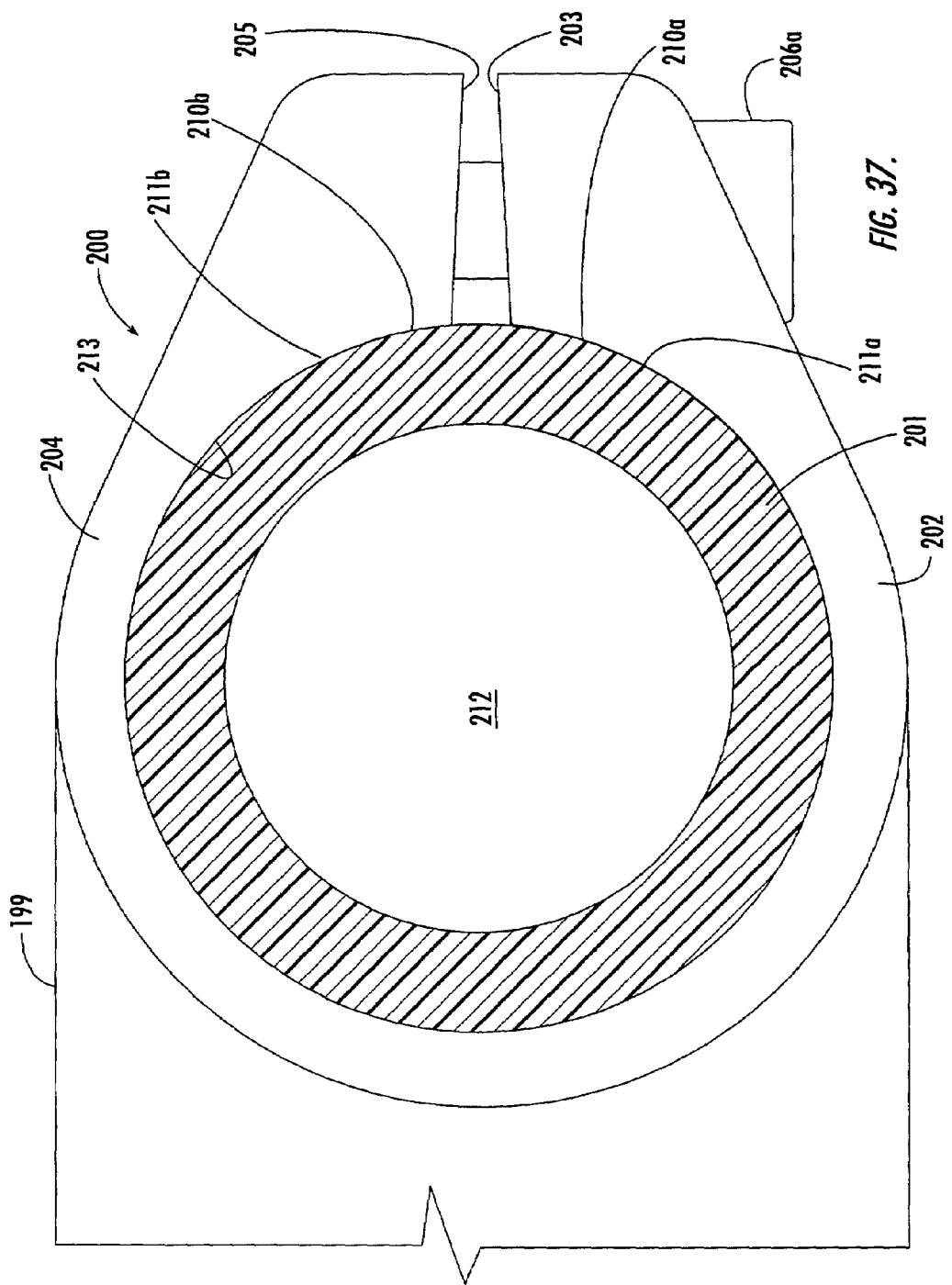

Turning now additionally to FIGS. 35-37, another embodiment of a bicycle stem 200 is now disclosed. In this embodiment, the object to be clamped to is the bicycle steering tube 201. The clamp portions 202, 204 include ends which define a single pair of opposing ends 203, 205. A body portion 199 extends from the clamp portions 202, 204 towards the handlebar clamping portion 208 at the opposite end of the body and for clamping to the handlebar 209.

The pair of opposing ends 203, 205 is urged together upon tightening of the fasteners 206a, 206b as will be readily appreciated by those skilled in the art. The clamp portions 202, 204 also have a recess 213 which defines a generally cylindrical opening 212 to receive the steering tube 201. The recess 213 includes relief areas 210a, 210b as seen in the preclamped state of FIG. 36. These relief areas 210a, 210b also extend to the respective ends 203, 205 and are deflected into engagement with the steering tube 201 when in the clamped state as shown in FIG. 37. The relief areas 210a, 210b may also include respective discontinuities 211a, 211b along the lines as described above.

In other variations of the stem 200, the pair of opposing ends 203, 205 can be rotated from the illustrated position, such as to provide more knee clearance to a rider, as will be appreciated by those skilled in the art. In yet other variations, the clamp portions 202, 204 may include a hinge, not shown, at a desired location spaced from the opposing ends to join the clamp portions together as will also be appreciated by those skilled in the art.

Figure 38:
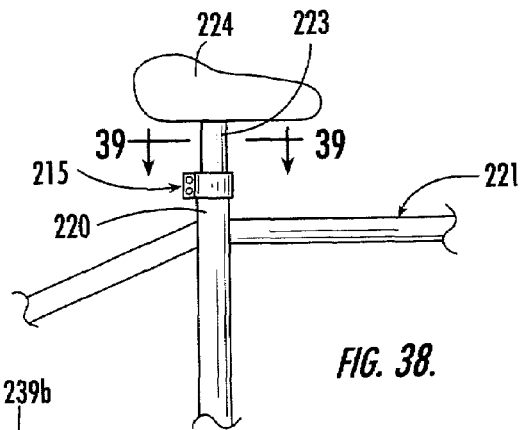
FIG. 38 is a side elevation view of a portion of a bicycle including a seat tube clamp with relief areas in accordance with the present invention.
Figure 39:
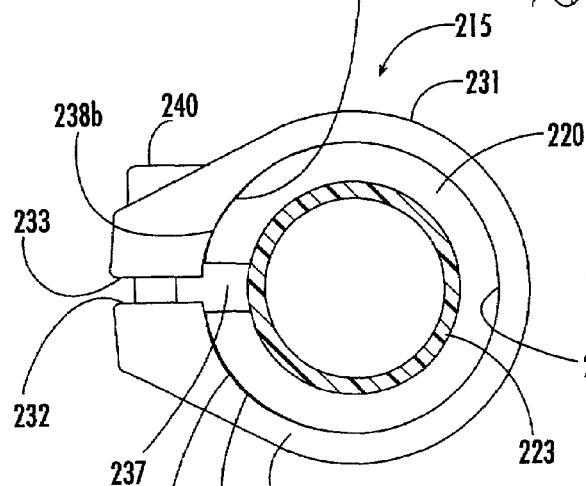
FIG. 39 is an enlarged cross-sectional view taken through lines 39-39 of FIG. 38 illustrating the seat tube clamp in the clamped state.
Figure 40:
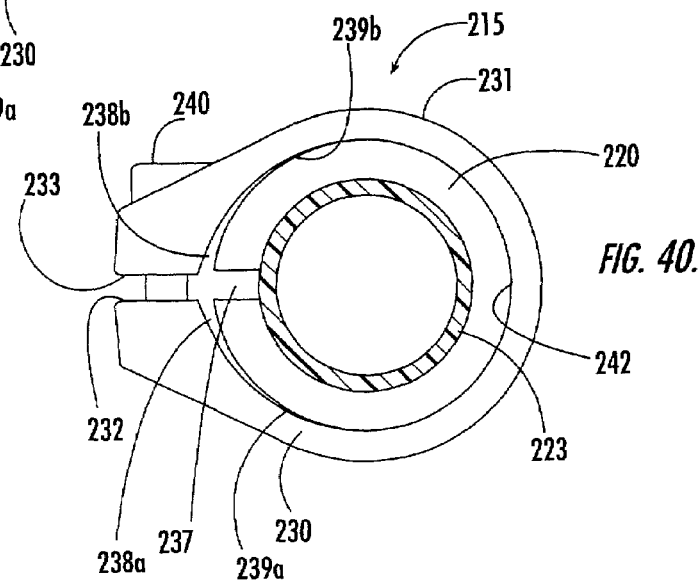
FIG. 40 is an enlarged cross-sectional view similar to FIG. 39, but showing the clamp in the preclamped state.

Referring now additionally to FIGS. 38-40 the clamping arrangement described above with reference to FIGS. 35-37 can also be adapted to a seat tube clamp 215 for a seat tube 220 of a bicycle frame 221. The seat tube 220, in turn, provides pressure to grip the seat post 223 which carries a bicycle seat 224 as shown in the illustrated embodiment and as will be appreciated by those skilled in the art. The seat tube 220 has a slotted opening 237 in an upper end thereof in the illustrated embodiment. This slotted opening 237 permits constriction of the seat tube 220 to thereby clamp to the seat post 223.

The seat tube clamp 215 includes first and second clamp portions 230, 231 with respective ends which define a pair of opposing ends 232, 233. A fastener 240 urges the clamp portions 230, 231 together which causes the relief areas 238a, 238b of the recess 242 to deflect into engagement with the seat tube 220 as the fastener is tightened. The fastener 240 can be a single threaded fastener or a combination threaded and cam actuated fastener, for example.

Discontinuities 239a, 239b are also formed in the recess 242 which effectively define the start of the respective relief areas 238a, 238b as will be appreciated by those skilled in the art. These relief areas 238a, 238b may be formed by any of the techniques as described above. In particular, FIG. 39 shows the clamp 215 in the clamped state and FIG. 40 shows the clamp in the preclamped state.

Figure 41:
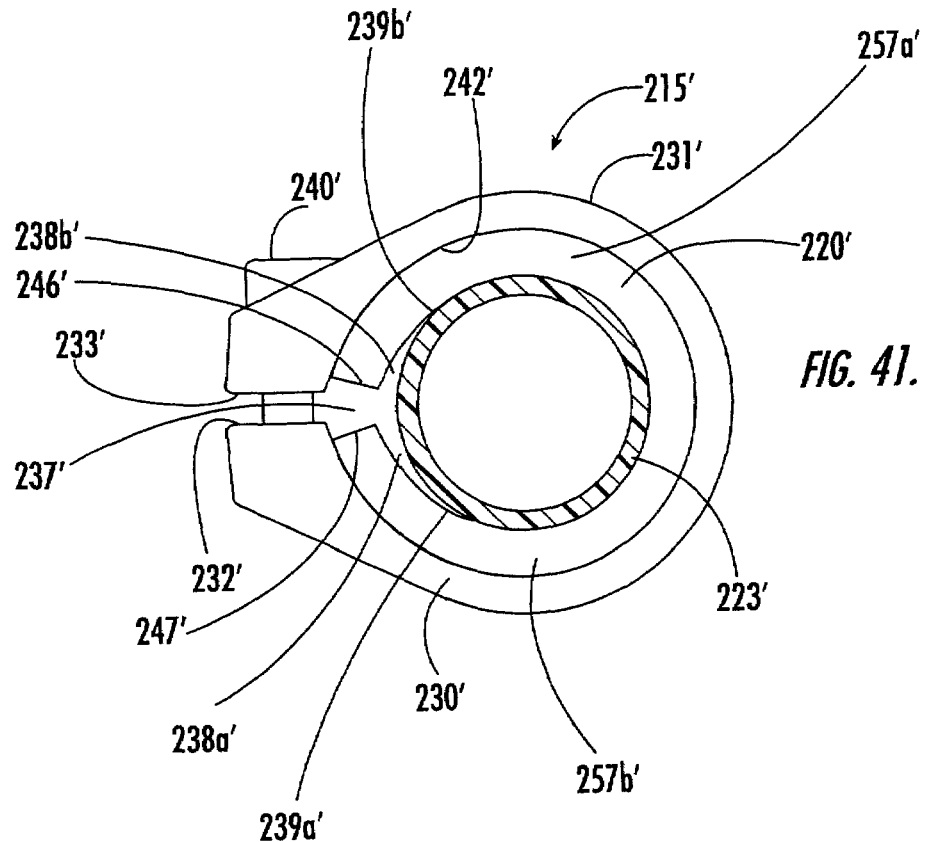
FIG. 41 is an enlarged cross-sectional view similar to FIG. 39, but showing a variation of the clamp and in the preclamped state.
Figure 42:
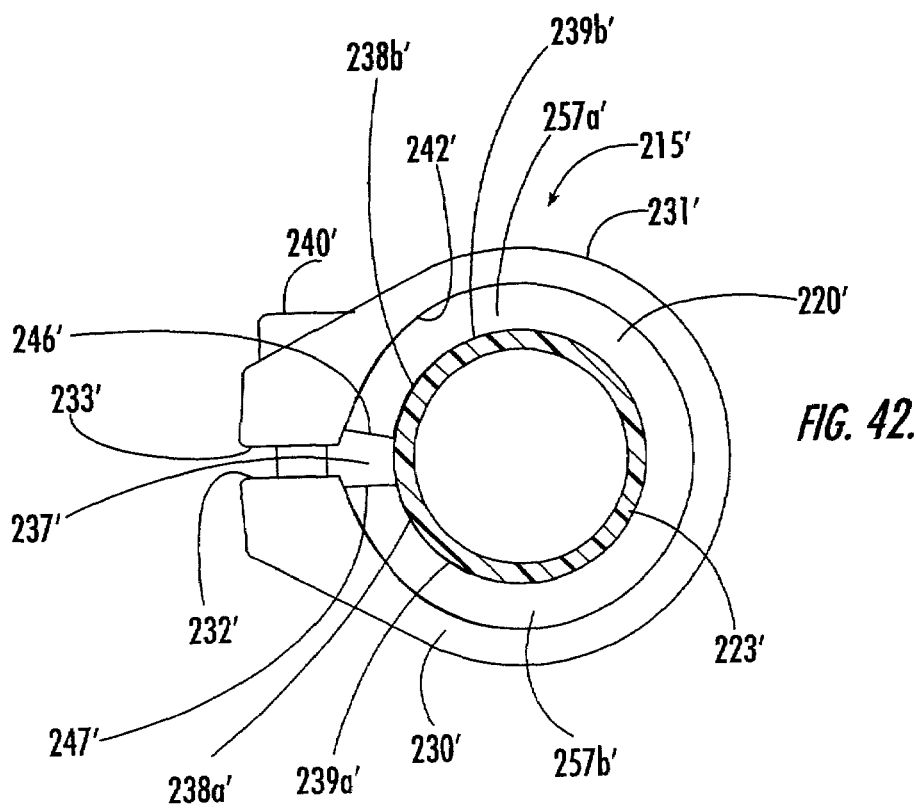
FIG. 42 is an enlarged cross-sectional view of the clamp as shown in FIG. 41, but in the clamped state.

Another variation of the seat tube clamp 215' is explained with reference to FIGS. 41 and 42, wherein FIG. 41 shows the clamp in the preclamped state and FIG. 42 shows the clamp in the clamped state. As will be apparent to those skilled in the art, in this variation, the seat tube 220' may be considered as a tubular sleeve having a slotted opening 237' defining a plurality of sleeve segments 257a', 257b'. The sleeve segments 257a', 257b' have respective recesses therein collectively defining the opening for receiving the seat post 223' to be clamped. The sleeve segments 257a', 257b' illustratively have respective ends 246', 247' defining pair of sleeve ends. Of course in other embodiments, more than one slotted opening 237' could be provided. In this embodiment of the clamp 215' relief areas 238a', 238b' are provided in the recesses of the sleeve segments 257a', 257b'. This embodiment also illustratively has the slotted opening 237' positioned aligned with the gap defined by the clamp ends 232', 233', however, in other embodiments the slotted opening could be offset.

Along the lines as discussed above, as the fastener 240' is tightened the relief areas 238a', 238b' are pressed into engagement with the adjacent portions of the seat post 223' and without digging into the seat post. Of course, this is especially advantageous for composite fiber/resin objects, such as graphite/epoxy resin handlebars, seat posts, handlebars, steering tubes, etc. as will be appreciated by those skilled in the art. Those other elements of the clamp 215' are similar to those described above and need no further discussion herein.

Figure 43:
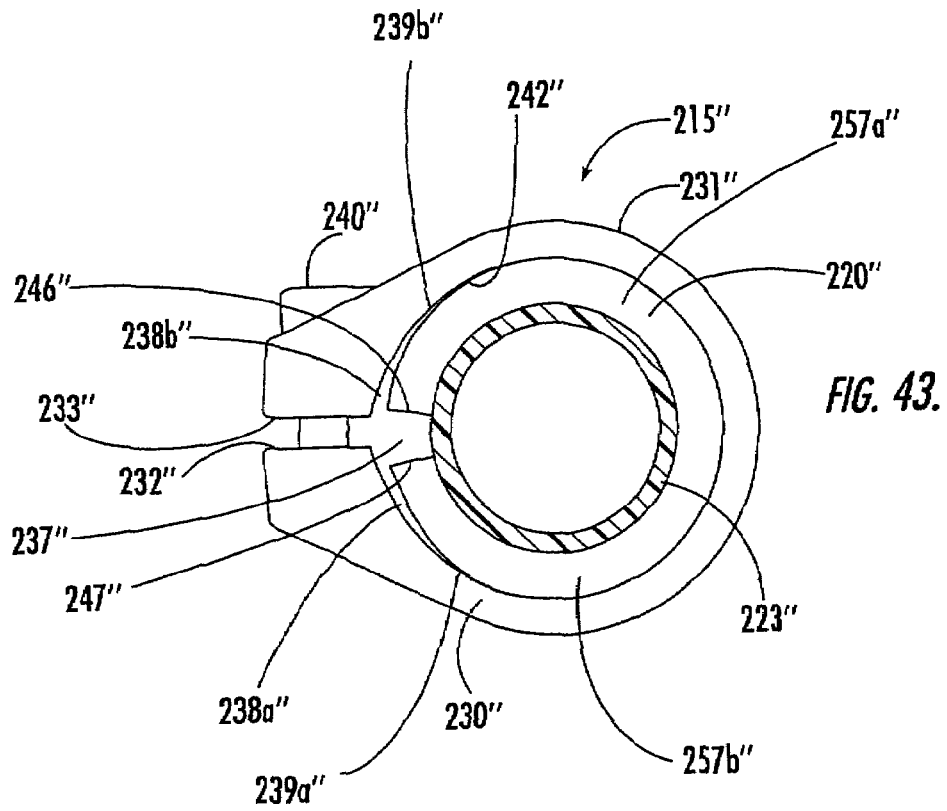
FIG. 43 is an enlarged cross-sectional view similar to FIG. 39, but showing another variation of the clamp and in the preclamped state.
Figure 44:
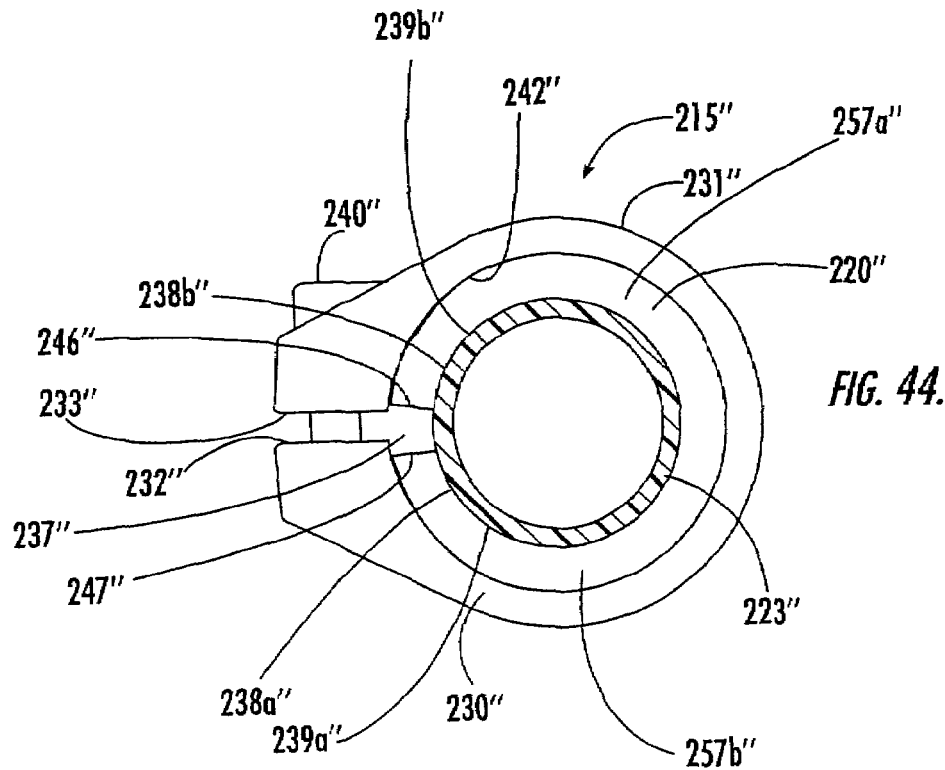
FIG. 44 is an enlarged cross-sectional view of the clamp as shown in FIG. 43, but in the clamped state.

Turning now additionally to FIG. 43 (preclamped state) and FIG. 44 (clamped state), yet another variation of the clamp 215"in accordance with the invention is described. In this variation, relief areas 238a", 238b" are provided on the outside surface of the seat tube 220". More particularly, the relief areas 238a", 238b" are provided adjacent the respective ends 247", 246" defined by the slotted opening 237". Those other elements of the clamp 215" are similar to those described above and need no further discussion herein.

Figure 45:
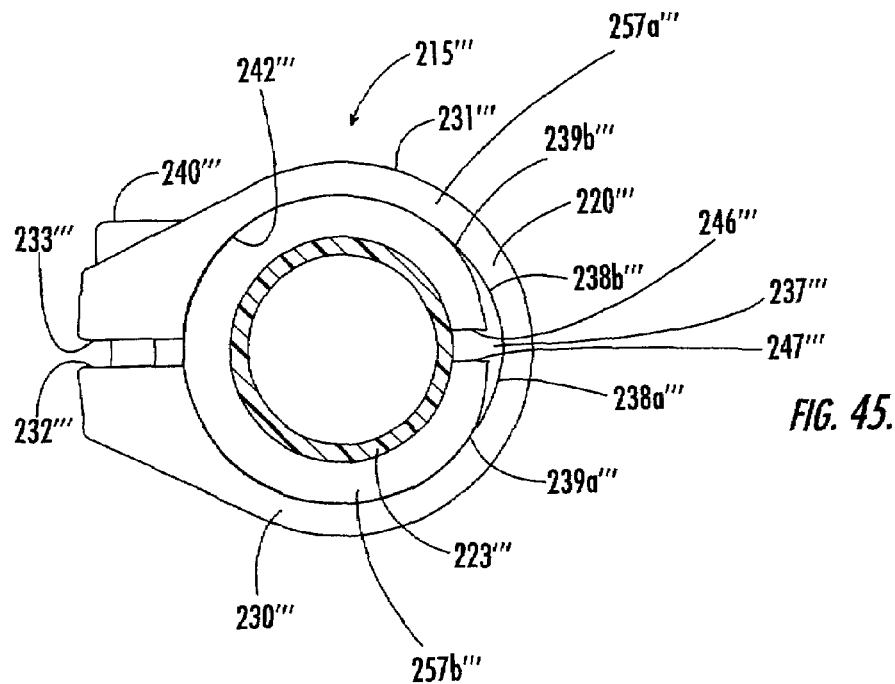
FIG. 45 is an enlarged cross-sectional view similar to FIG. 39, but showing yet another variation of the clamp and in the preclamped state.
Figure 46:
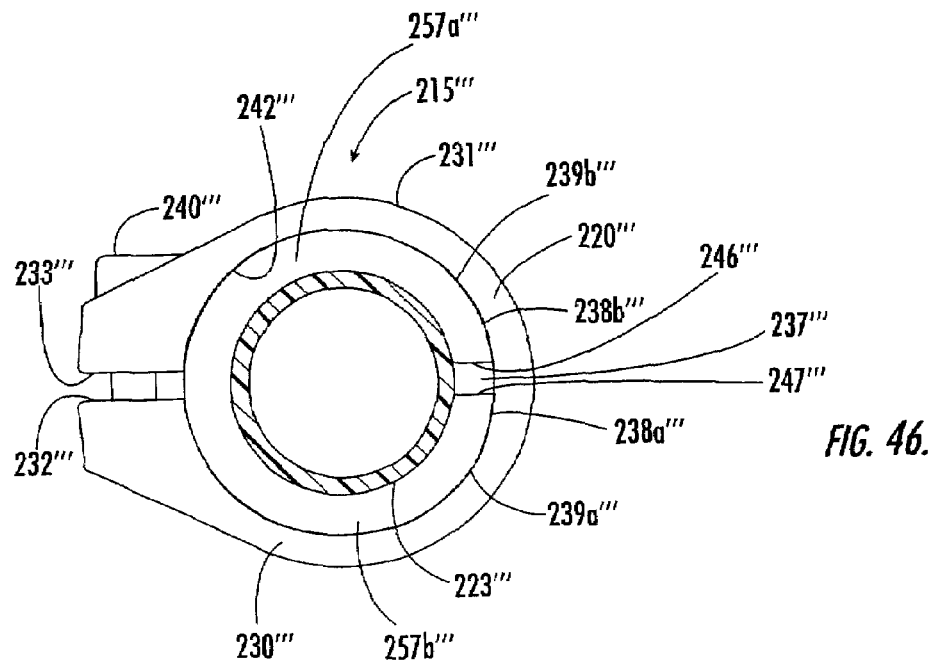
FIG. 46 is an enlarged cross-sectional view of the clamp as shown in FIG. 45, but in the clamped state.

Yet another embodiment of the invention is now described with reference to FIG. 45 (clamped state) and FIG. 46 (clamped state). In this variation of a clamping arrangement, relief areas 238a''', 238b''' are provided in an interior portion of the recess 242''' and spaced from the ends 232''', 233''' of the clamp portions 230''', 231''', yet adjacent the pair of ends 246''', 247''' of the seat tube 220'''. As will be readily appreciated by those skilled in the art, this configuration also provides similar advantages in terms of reducing the likelihood of digging into the seat post 223'''. Of course, in yet other embodiments, relief areas can be provided on clamp portions 230''', 231'''.

Another aspect of the invention relates to a method for making the clamps as described above with reference to FIGS. 29-45. The method may include providing a plurality of clamp portions having respective recesses therein collectively defining a generally circular cylindrical opening for receiving an object to be clamped, and with the clamp portions having respective ends defining at least one pair of opposing ends. The method may also include providing at least one fastener for urging the at least one pair of opposing ends toward each other during movement from a preclamped state to a clamped state. Moreover, the method may also include forming at least one relief area in at least one of the recesses to extend to at least one adjacent end in the preclamped state and being deflected into engagement with the object in the clamped state.

Although the invention is directed primarily to clamps for a bicycle stem, and a seat tube clamp, the same or similar concepts are also applicable to connection from one body or device to a tube, rod or bar. For example, the clamp concepts can be readily extended to any such connections where it is desired to clamp to a tube or solid round bar or rod, for example. Accordingly, many modifications and other embodiments of the invention will come to the mind of one skilled in the art.

In addition, other features relating to the bicycle stem are disclosed in co-pending patent applications assigned to the assignee of the present invention and are entitled BICYCLE STEM INCLUDING ENHANCED CLAMP AND ASSOCIATED METHODS, Ser. No. 09/658,282; BICYCLE STEM HAVING VISUAL MAINTENANCE INDICATION AND ASSOCIATED METHODS, and U.S. Pat. No. 6,309,135, issued Oct. 30, 2001, titled OBJECT CLAMP INCLUDING CLAMP MEMBERS AND ASSOCIATED METHODS, Ser. No. 09/657,423; the entire disclosures of which are incorporated herein in their entirety by reference. Therefore, it is to be understood that the invention is not to be limited to the specific embodiments disclosed, and that modifications and embodiments are intended to be included within the scope of the appended claims.

That which is claimed is:

1. An object clamp comprising:
a plurality of clamp portions having respective recesses therein collectively defining a generally circular cylindrical opening for receiving an object to be clamped, said clamp portions having respective ends defining at least one pair of opposing ends; and
at least one fastener for urging the at least one pair of opposing ends toward each other during movement from a preclamped state to a clamped state;
at least one of the recesses having at least one relief area therein opening outwardly to at least one adjacent end in the preclamped state and being deflected into engagement with the object in the clamped state;
the generally circular cylindrical opening being defined by a main axis and a main radius extending therefrom in the preclamped state;
the at least one relief area being defined by at least one relief axis and at least one relief radius extending therefrom with the at least one relief axis being offset from the main axis in the preclamped state;
the at least one relief area being defined by an intersection with adjacent portions of a respective recess in the preclamped state, and the intersection being angularly spaced inward from the adjacent end in a range of about 4 to 60 degrees.

2. An object clamp according to claim 1 wherein the at least one relief radius is less than or equal to the main radius.

3. An object clamp according to claim 1 wherein the at least one pair of opposing ends has at least one pair of aligned fastener receiving passageways therein.

4. An object clamp according to claim 1 wherein the at least one pair of opposing ends comprises a single pair of opposing ends.

5. An object clamp according to claim 1 wherein the at least one pair of opposing ends comprises first and second pairs of opposing ends.

6. An object clamp according to claim 5 wherein the first and second pairs of opposing ends are separated by about 180 degrees.

7. An object clamp according to claim 1 wherein the generally circular cylindrical opening is for receiving a bicycle steering tube as the object to be clamped.

8. An object clamp according to claim 1 wherein the generally circular cylindrical opening is for receiving a bicycle handlebar as the object to be clamped.

9. An object clamp according to claim 1 wherein the generally circular cylindrical opening is for receiving a bicycle seat tube as the object to be clamped.

10. An object clamp according to claim 1 further comprising a body portion connected to at least one of said clamp portions and extending outwardly therefrom.

11. A bicycle component clamp comprising:
a plurality of clamp portions having respective recesses therein collectively defining a generally circular cylindrical opening for receiving the bicycle component to be clamped, said clamp portions having respective ends defining first and second pairs of opposing ends; and
respective fasteners for urging the first and second pairs of opposing ends toward each other during movement from a preclamped state to a clamped state;
at least one of the recesses having at least one relief area therein opening outwardly to at least one adjacent end in the preclamped state and being deflected into engagement with the bicycle component in the clamped state;
the generally circular cylindrical opening being defined by a main axis and a main radius extending therefrom in the preclamped state;
the at least one relief area being defined by at least one relief axis and at least one relief radius extending therefrom with the at least one relief axis being offset from the main axis in the preclamped state;
the at least one relief area being defined by an intersection with adjacent portions of a respective recess in the preclamped state, and the intersection being angularly spaced inward from the adjacent end in a range of about 4 to 60 degrees.

12. A bicycle component clamp according to claim 11 wherein the at least one relief radius is less than or equal to the main radius.

13. A bicycle component clamp according to claim 11 wherein each of the first and second pairs of opposing ends has at least one pair of aligned fastener receiving passageways therein.

14. A bicycle component clamp according to claim 11 wherein the first and second pairs of opposing ends are separated by about 180 degrees.

15. A bicycle component clamp according to claim 11 further comprising a body portion connected to at least one of said clamp portions and extending outwardly therefrom.

16. A clamping arrangement comprising:
a composite fiber and resin object;
a clamp connected to said composite fiber and resin object and comprising
a plurality of clamp portions having respective recesses therein collectively defining a generally circular cylindrical opening receiving said composite fiber and resin object, said clamp portions having respective ends defining at least one pair of ends, and
at least one fastener for urging the at least one pair of ends toward each other during movement from a preclamped state to a clamped state,
at least one of the recesses having at least one relief area therein opening outwardly to at least one adjacent end in the preclamped state and being deflected into engagement with said composite fiber and resin object in the clamped state;
the generally circular cylindrical opening being defined by a main axis and a main radius extending therefrom in the preclamped state;
the at least one relief area being defined by at least one relief axis and at least one relief radius extending therefrom with the at least one relief axis being offset from the main axis in the preclamped state.

17. A clamping arrangement according to claim 16 wherein each relief area defines an intersection with adjacent portions of a respective recess in the preclamped state; and wherein the intersection is angularly spaced inward from the adjacent end in a range of about 4 to 60 degrees.

18. A clamping arrangement according to claim 16 wherein the at least one pair of ends has at least one pair of aligned fastener receiving passageways therein.

19. A clamping arrangement according to claim 16 wherein the at least one pair of ends comprises a single pair of opposing ends.

20. A clamping arrangement according to claim 16 wherein the at least one pair of ends comprises first and second pairs of opposing ends.

21. A clamping arrangement according to claim 16 wherein said composite fiber and resin object comprises a bicycle component.

* * * * *

UNITED STATES PATENT AND TRADEMARK OFFICE
CERTIFICATE OF CORRECTION

PATENT NO. : 7,500,415 B2  Page 1 of 1
APPLICATION NO. : 10/121027
DATED : March 10, 2009
INVENTOR(S) : Thomson et al.

It is certified that error appears in the above-identified patent and that said Letters Patent is hereby corrected as shown below:

Column 5, Line 3     Delete: "ride"
                     Insert: --right--

Column 5, Line 23    Delete: "is side"
                     Insert: --is a side--

Column 7, Line 53    Delete: "41b''"
                     Insert: --41b'--

Column 9, Line 23    Delete: "41b''"
                     Insert: --41b'--

Column 11, Line 22   Delete: "now to"
                     Insert: --now--

Signed and Sealed this

Ninth Day of June, 2009

JOHN DOLL
*Acting Director of the United States Patent and Trademark Office*